United States Patent
Cheng et al.

(10) Patent No.: US 12,238,199 B2
(45) Date of Patent: Feb. 25, 2025

(54) SECURE MULTI-PARTY COMPUTATION METHOD AND APPARATUS, DEVICE, AND STORAGE MEDIUM

(71) Applicant: Tencent Technology (Shenzhen) Company Limited, Shenzhen (CN)

(72) Inventors: Yong Cheng, Shenzhen (CN); Yangyu Tao, Shenzhen (CN); Fangcheng Fu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 231 days.

(21) Appl. No.: 17/992,685

(22) Filed: Nov. 22, 2022

(65) Prior Publication Data
US 2023/0087864 A1 Mar. 23, 2023

Related U.S. Application Data

(63) Continuation of application No. PCT/CN2022/087068, filed on Apr. 15, 2022.

(30) Foreign Application Priority Data

May 10, 2021 (CN) .......................... 202110503941.7

(51) Int. Cl.
*H04L 9/00* (2022.01)
*H04L 9/06* (2006.01)
(Continued)

(52) U.S. Cl.
CPC ............ *H04L 9/008* (2013.01); *H04L 9/0618* (2013.01); *H04L 9/0869* (2013.01); *H04L 9/3073* (2013.01); *H04L 2209/46* (2013.01)

(58) Field of Classification Search
CPC ..... H04L 9/008; H04L 9/0618; H04L 9/0869; H04L 9/3073; H04L 2209/46; H04L 9/00;
(Continued)

(56) References Cited

U.S. PATENT DOCUMENTS

2019/0363871 A1 11/2019 Cheon et al.
2021/0367786 A1* 11/2021 Sheets ................... H04L 9/0894

FOREIGN PATENT DOCUMENTS

| CN | 111510281 A | 8/2020 |
| CN | 111639345 A | 9/2020 |

(Continued)

OTHER PUBLICATIONS

International Search Report with English translation, dated Jun. 27, 2022, pp. 1-5, issued in International Patent Application No. PCT/CN2022/087068, China National Intellectual Property Administration, Beijing, China.

*Primary Examiner* — Quazi Farooqui
(74) *Attorney, Agent, or Firm* — Crowell & Moring LLP

(57) ABSTRACT

A secure multi-party computation method and apparatus, a device, and a storage medium are provided, which belong to the field of data security technologies. The method includes: performing homomorphic encryption processing on first plaintext data to generate first ciphertext data; transmitting encrypted data containing the first ciphertext data to a second node device; receiving difference ciphertext data transmitted by the second node device; and decrypting the difference ciphertext data to obtain a positive and negative property of a difference between the first plaintext data and the second plaintext data. The foregoing method and apparatus, device, and storage medium are conducive to reducing the number of times of communications of secure multi-party computation, have low communication overhead and
(Continued)

high computation efficiency, and enable magnitude comparison and equality testing to be performed simultaneously.

20 Claims, 12 Drawing Sheets

(51) Int. Cl.
  *H04L 9/08* (2006.01)
  *H04L 9/30* (2006.01)
(58) Field of Classification Search
  CPC ............... G06F 21/602; G06F 21/6209; G06F 2221/2107
  See application file for complete search history.

(56) References Cited

FOREIGN PATENT DOCUMENTS

| | | |
|---|---|---|
| CN | 112182660 A | 1/2021 |
| CN | 112906044 A | 6/2021 |

* cited by examiner

SECURE MULTI-PARTY COMPUTATION METHOD AND APPARATUS, DEVICE, AND STORAGE MEDIUM

RELATED APPLICATION

This application is a continuation of International Application No. PCT/CN2022/087068, filed Apr. 15, 2022, which claims priority to Chinese Patent Application No. 202110503941.7, entitled "SECURE MULTI-PARTY COMPUTATION METHOD AND APPARATUS, DEVICE, AND STORAGE MEDIUM" filed on May 10, 2021. The contents of International Application No. PCT/CN2022/087068 and Chinese Patent Application No. 202110503941.7 are each incorporated herein by reference in their entirety.

FIELD OF THE TECHNOLOGY

Embodiments of this application relate to the field of data security technologies, and in particular, to a secure multi-party computation method and apparatus, a device, and a storage medium.

BACKGROUND OF THE APPLICATION

The study of secure multi-party computation is mainly aimed at the issue of how to safely calculate an agreed function in the absence of a trusted third party. The secure multi-party computation can enable secure data cooperation and fusion applications and combine multi-party data sources for computation, analysis, and learning under the premise that the data is not out of the domain and is legally compliant, to thereby achieve data value sharing.

In the related art, for secure multi-party computation, a method for comparing magnitudes of values and performing equality testing generally employs oblivious transfer technology or homomorphic encryption technology.

However, for the magnitude comparison and equality testing method based on the oblivious transfer technology, the number of times of communication interactions between various participants is relatively high, the communication overhead is high, and the efficiency is low, while the method based on the homomorphic encryption technology has relatively high computation complexity, which cannot be applied in practice.

SUMMARY

Embodiments of this application provide a secure multi-party computation method and apparatus, a device, and a storage medium, which can reduce the communication overhead and improve the computation efficiency. The technical solutions are as follows.

According to an aspect, this application provides a secure multi-party computation method, performed by a first node device in a joint computing system, the method including the following steps:
  performing homomorphic encryption processing on first plaintext data to generate first ciphertext data;
  transmitting encrypted data containing the first ciphertext data to a second node device, the second node device being configured to obtain second ciphertext data based on the encrypted data and second plaintext data and calculate difference ciphertext data based on the first ciphertext data and the second ciphertext data;
  receiving the difference ciphertext data transmitted by the second node device; and
  decrypting the difference ciphertext data to obtain a positive and negative property of a difference between the first plaintext data and the second plaintext data.

According to another aspect, this application provides a secure multi-party computation method, performed by a second node device in a joint computing system, the method including the following steps:
  receiving encrypted data transmitted by a first node device, the encrypted data containing first ciphertext data, and the first node device being configured to perform homomorphic encryption processing on first plaintext data to generate the first ciphertext data;
  generating second ciphertext data based on the encrypted data and second plaintext data;
  calculating difference ciphertext data based on the first ciphertext data and the second ciphertext data; and
  transmitting the difference ciphertext data to the first node device, the first node device being configured to decrypt the difference ciphertext data to obtain a positive and negative property of a difference between the first plaintext data and the second plaintext data.

According to still another aspect, this application provides a secure multi-party computation apparatus, including the following structures:
  an encryption module, configured to perform homomorphic encryption processing on first plaintext data to generate first ciphertext data;
  a transmission module, configured to transmit encrypted data containing the first ciphertext data to a second node device, the second node device being configured to obtain second ciphertext data based on the encrypted data and second plaintext data and calculate difference ciphertext data based on the first ciphertext data and the second ciphertext data;
  a receiving module, configured to receive the difference ciphertext data transmitted by the second node device; and
  a decryption module, configured to decrypt the difference ciphertext data to obtain a positive and negative property of a difference between the first plaintext data and the second plaintext data.

According to still another aspect, this application provides a secure multi-party computation apparatus, including the following structures:
  a receiving module, configured to receive encrypted data transmitted by a first node device, the encrypted data containing first ciphertext data, and the first node device being configured to perform homomorphic encryption processing on first plaintext data to generate the first ciphertext data;
  an encryption module, configured to generate second ciphertext data based on the encrypted data and second plaintext data;
  a calculation module, configured to calculate difference ciphertext data based on the first ciphertext data and the second ciphertext data; and
  a transmission module, configured to transmit the difference ciphertext data to the first node device, the first node device being configured to decrypt the difference ciphertext data to obtain a positive and negative property of a difference between the first plaintext data and the second plaintext data.

According to still another aspect, this application provides a computer device, including a processor and a memory, the memory storing at least one program, the at least one program being loaded and executed by the processor to implement the secure multi-party computation method according to the foregoing aspects.

According to still another aspect, this application provides a non-transitory computer-readable storage medium, storing at least one computer program, the computer program being loaded and executed by a processor to implement the secure multi-party computation method according to the foregoing aspects.

According to an aspect of this application, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to implement the secure multi-party computation method provided in the optional implementations in the foregoing aspects.

The technical solutions provided in the embodiments of this application include at least the following beneficial effects:

In the embodiments of this application, data transmitted by both node devices to each other is ciphertext data, and difference ciphertext data is decrypted through a homomorphic encryption algorithm to obtain a positive and negative property of a difference between first plaintext data and second plaintext data. In this way, magnitude comparison and equality testing are realized simultaneously under the premise that neither participant discloses its own data to the other, nor does it rely on a trusted third party. Compared with the computation method in the related art, each of the two node devices only needs to perform data transmission and reception once, which reduces the number of times of communications, has low communication overhead and high computation efficiency, and enables the magnitude comparison and the equality testing to be performed simultaneously.

DETAILED DESCRIPTION

Figure 1:
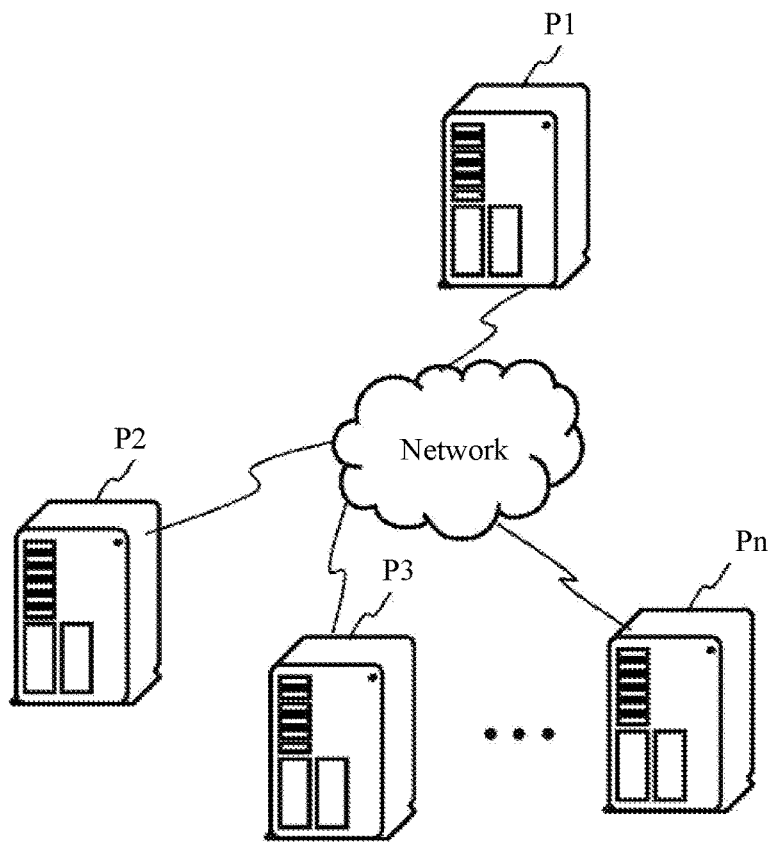
FIG. 1 is a schematic diagram of an implementation environment according to an exemplary embodiment of this application.

First, the terms involved in embodiments of this application are introduced as follows:

1). Secure multi-party computation: Refer to joint computation of a function f (X1, X2, . . . , and XN) by N participants P1, P2, . . . , and PN without leaking their input data to any other participant and without relying on any trusted authority, the participant Pi processing input data Xi. The secure multi-party computation has a rich theoretical foundation, and ensures the security of input data through a variety of security mechanisms such as application cryptography (such as homomorphic encryption), secret sharing, and differential privacy, and the secure multi-party computation begins to move from a theoretical research phase to an engineering and large-scale application phase.

2) Homomorphic encryption: One of the most commonly used methods to achieve secure multi-party computation. Homomorphic encryption (HE) is an encryption form that allows algebraic operations on a ciphertext in a specific form, and an obtained result is still an operation result in the ciphertext space. The result obtained by decrypting the operation result in the ciphertext space is equal to a result obtained by performing the same operation on a plaintext. In other words, the operation in the ciphertext space is equal to an operation in a plaintext space. Therefore, through the homomorphic encryption technology, an operation may be performed on encrypted data without decrypting the data during the entire operation.

Recently, it is difficult to integrate dispersed data sources for computation, analysis, and learning due to user privacy, data security, legal compliance, commercial competition and other factors. Under this background, solutions based on secure multi-party computation (MPC) are rapidly evolving, which can combine multiple distributed data sources for joint computation, joint data analysis, and joint machine learning without the need of centralizing the dispersed data sources. The secure multi-party computation can enable secure data cooperation and fusion applications and combine multi-party data sources for computation, analysis, and learning under the premise that the data is not out of the domain and is legally compliant, to thereby achieve data value sharing.

Generally, the magnitude comparison and equality testing method in related art uses oblivious transfer (OT) technology, which is also referred to as blur transfer technology, or is based on homomorphic encryption technology. Usually, the magnitude comparison and the equality testing need to be implemented separately. For the magnitude comparison and equality testing method based on oblivious transfer in the related art, although the computation complexity is low, two participants A and B have a large number of times of communication interactions, the communication overhead is high, and the communication efficiency is low, which is not applicable to application scenarios of cross-public network communication. On the other hand, for the magnitude comparison and equality testing method based on homomorphic encryption, the computation complexity is too high, which is not applicable in practice. In addition, most of the magnitude comparison and equality testing methods in the related art cannot complete both magnitude comparison and equality testing of two numbers x and y simultaneously.

In order to solve the above technical problems, the embodiments of this application propose a semi-honest secure model. In the semi-honest secure model, it can be ensured that the participants do not leak their own data. The semi-honest secure model, which is also referred to as the honest-but-curious secure model, means that both the participants A and B strictly adhere to the magnitude comparison and equality testing protocol, do not maliciously deviate from the protocol, and do not maliciously or actively attack the other party, but try to obtain more information during the implementation of the protocol.

FIG. 1 is a block diagram of a joint computing system according to an embodiment of this application. The joint computing system includes n node devices (also referred to as participants), namely a node device P1, a node device P2, . . . , and a node device Pn. Any one of the node devices may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. In addition, any two node devices have different data sources, such as data sources of different companies, or data sources of different departments of the same company. Different data is stored in different node devices.

Different node devices are connected via a wireless network or a wired network.

The n node devices each store their own data, and the data cannot be leaked. When there is a need for numerical comparison between two node devices in the joint computing system, for example, P1 and P2, P1, as a first node device, performs homomorphic encryption processing on its own plaintext data to generate first ciphertext data, and transmits encrypted data containing the first ciphertext data to P2; and P2, as a second node device, generates second ciphertext data based on the encrypted data and second plaintext data, then calculates difference ciphertext data, and transmits the difference ciphertext data to P1. Accordingly, P1 decrypts the difference ciphertext data to obtain a decryption result that can reflect a positive and negative property of a difference between first plaintext data and second plaintext data, and then obtains a numerical comparison result. Alternatively, the foregoing steps are performed by using P2 as the first node device and using P1 as the first node device, and the numerical comparison can also be performed without leakage of its own data. In this process, data of the two participants is not leaked, and each only needs to perform data transmission and reception once, which has low communication overhead and high computation efficiency.

When a node device that needs to perform magnitude comparison on data in three or more node devices is present in the joint computing system, for example, when P1 needs to acquire a magnitude relationship between the data x1, x2, and x3 possessed by P1, P2, and P3, secure multi-party computation is performed between every two of the devices. For example, P1 is used as the first node device and P2 is used as the second node device to compare the magnitudes of x1 and x2, P2 is used as the first node device and P3 is used as the second node device to compare the magnitudes of x2 and x3, and P1 is used as the first node device and P3 is used as the second node device to compare the magnitudes of x1 and x3, thereby obtaining the magnitude relationship of x1, x2, and x3.

In a possible implementation, the multiple node devices in the joint computing system may be formed into a blockchain, the node devices are nodes on the blockchain, and data involved in the secure multi-party computation process may be saved on the blockchain.

Figure 2:
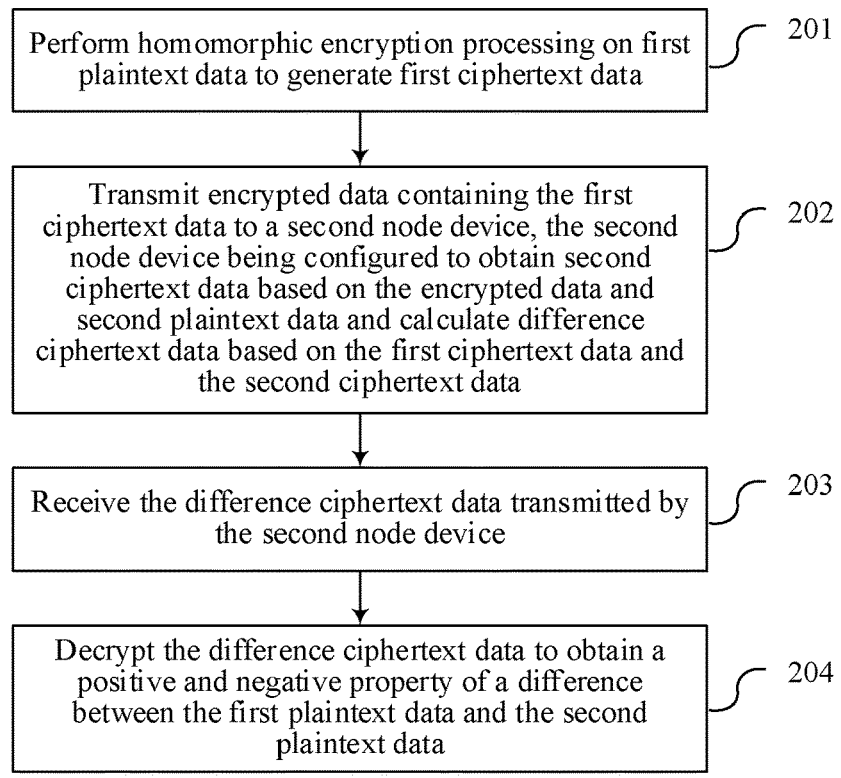
FIG. 2 is a flowchart of a secure multi-party computation method according to an exemplary embodiment of this application.

FIG. 2 is a flowchart of a secure multi-party computation method according to an exemplary embodiment of this application. This embodiment is described by using an example in which the method is performed by a first node device in a joint computing system. The method includes the following steps:

Step 201: Perform homomorphic encryption processing on first plaintext data to generate first ciphertext data.

The first node device in the joint computing system stores first plaintext data, and the second node device stores second plaintext data. When the first node device and/or the second node device need to perform a magnitude comparison on the first plaintext data and the second plaintext data, in order to achieve the magnitude comparison under the condition that neither party discloses its own data to the other, the first node device first performs homomorphic encryption processing on the first plaintext data to generate first ciphertext data.

Optionally, the first ciphertext data is ciphertext data obtained by directly encrypting the first plaintext data by the first node device, or maybe ciphertext data obtained by pre-processing the first plaintext data and then encrypting the pre-processing result by the first node device, which is not limited in this embodiment of this application.

For example, a node device A stores a digital x, and a node device B stores a digital y. When the node device A or the node device B needs to compare the magnitudes of x and y, the node device A first performs homomorphic encryption processing on x to obtain [x] (that is, a ciphertext of x), or the node device B first performs homomorphic encryption processing on y to obtain [y] (that is, a ciphertext of y).

Step 202: Transmit encrypted data containing the first ciphertext data to a second node device, the second node device being configured to obtain second ciphertext data based on the encrypted data and second plaintext data and calculate difference ciphertext data based on the first ciphertext data and the second ciphertext data.

After generating the first ciphertext data, the first node device transmits the first ciphertext data to the second node device, so that the second node device calculates difference ciphertext data based on the first ciphertext data and the second ciphertext data.

In a possible implementation, in this embodiment of this application, the participants first jointly compute, through homomorphic encryption, a difference of the ciphertext data, that is, the difference ciphertext data, and then decrypt the difference ciphertext data to obtain data that can reflect a positive and negative property of a difference between the first plaintext data and the second plaintext data. Therefore, the second node device first needs to perform homomorphic encryption processing on the second plaintext data based on the encrypted data, so that the first plaintext data and the second plaintext data are encrypted in the same manner, to achieve homomorphic operation and ensure that the first node device cannot obtain the second plaintext data.

After generating the second ciphertext data, the second node device calculates the difference ciphertext data based on the first ciphertext data and the second ciphertext data. The difference ciphertext data is a difference obtained by respectively performing, by the second node device, data processing on the first ciphertext data and the second ciphertext data and subtracting the ciphertexts after the data processing. The second node device does not directly encrypt the second plaintext data in the encryption manner of the first node device to obtain the second ciphertext data and then subtract the second ciphertext data from the first ciphertext data to obtain the difference ciphertext data. Otherwise, the first node device can obtain the second plaintext data based on the difference ciphertext data.

The difference ciphertext data contains encrypted information of the difference between the first plaintext data and the second plaintext data, that is, data that can reflect the positive and negative property of the difference between the first plaintext data and the second plaintext data can be obtained by decrypting the difference ciphertext data.

Because the second node device does not know how to decrypt the difference ciphertext data, after calculating the difference ciphertext data, the second node device transmits the difference ciphertext data to the first node device, so that the first node device decrypts the difference ciphertext data based on a decryption manner of a homomorphic encryption algorithm, and obtains the magnitude relationship between the first plaintext data and the second plaintext data.

Step 203: Receive the difference ciphertext data transmitted by the second node device.

The first node device receives the difference ciphertext data transmitted by the second node device, and compares the magnitudes of the first plaintext data and the second plaintext data based on the difference ciphertext data.

Step 204: Decrypt the difference ciphertext data to obtain a positive and negative property of a difference between the first plaintext data and the second plaintext data.

In a possible implementation, after the first node device decrypts to obtain a positive and negative property of the difference between the two pieces of plaintext data, the magnitude relationship between the first plaintext data and the second plaintext data may be inferred from the positive and negative property, that is, it can be determined that the first plaintext data is greater than the second plaintext data, or the first plaintext data is less than the second plaintext data, or the first plaintext data is equal to the second plaintext data.

After the first node device decrypts the difference ciphertext data, the obtained data is a multiple of the difference between the first plaintext data and the second plaintext data, and a positive and negative property of the data is consistent with the positive and negative property of the difference between the first plaintext data and the second plaintext data.

It is worth mentioning that the terms "first" and "second" as used with the terms "node device" and "data" in this embodiment of this application do not refer to any specific node device or data. In order to facilitate the description, this embodiment of this application is described using an example in which the method is performed by the first node device. In another possible implementation, the secure multi-party computation method provided by this embodiment of this application may alternatively be performed by the second node device.

For example, a participant A and a participant B are included in the secure multi-party computation. The participant A stores data x, and the participant B stores data y. When at least one of the two participants needs to perform a numerical comparison, the participant A may perform homomorphic encryption processing on x to obtain first ciphertext data, the participant B may calculate difference ciphertext data based on encrypted data containing the first ciphertext data and the second plaintext data y, and finally the participant A may decrypt the difference ciphertext data to obtain a numerical comparison result. Alternatively, the participant B may perform homomorphic encryption processing on y to obtain the first ciphertext data, the participant A may calculate the difference ciphertext data based on the encrypted data containing the first ciphertext data and the second plaintext data x, and finally the participant B may decrypt the difference ciphertext data to obtain a numerical comparison result.

In conclusion, in this embodiment of this application, the data transmitted by both node devices to each other is ciphertext data, and difference ciphertext data is decrypted through a homomorphic encryption algorithm to obtain a positive and negative property of a difference between first plaintext data and second plaintext data. In this way, magnitude comparison and equality testing are realized simultaneously under the premise that neither participant discloses its own data to the other, nor does it rely on a trusted third party. Compared with the computation method in the related art, each of the two node devices only needs to perform data transmission and reception once, which reduces the number of times of communications, has low communication overhead and high computation efficiency, and enables the magnitude comparison and the equality testing to be performed simultaneously.

Figure 3:
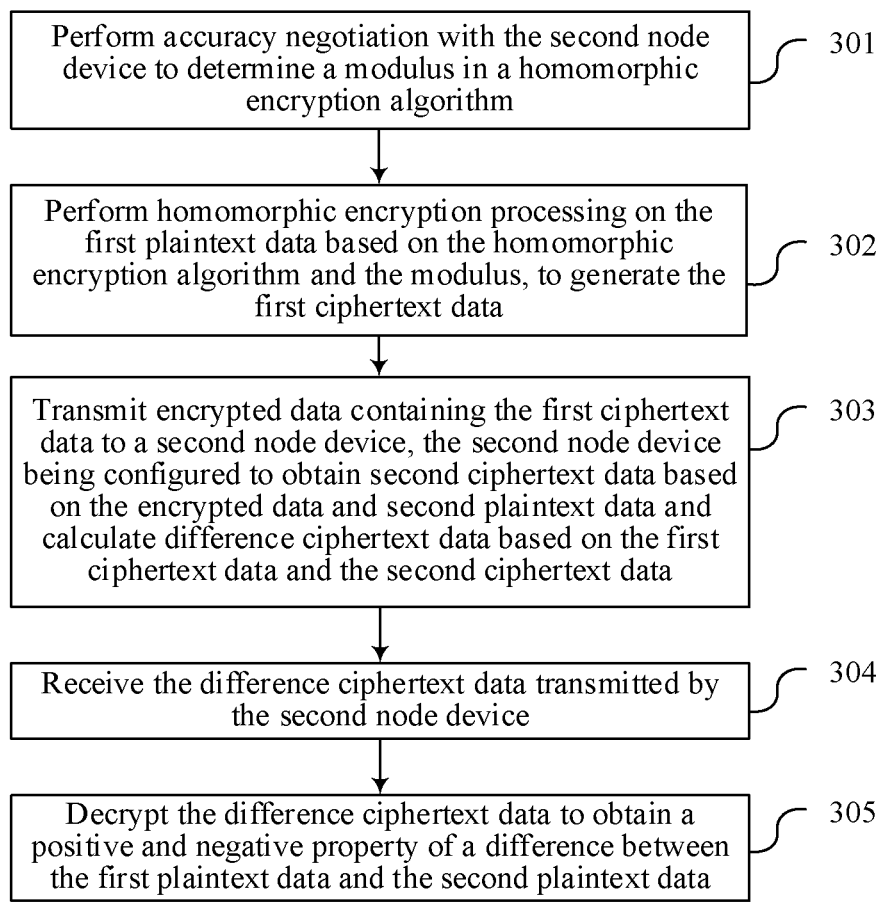
FIG. 3 is a flowchart of a secure multi-party computation method according to another exemplary embodiment of this application.

FIG. 3 is a flowchart of a secure multi-party computation method according to another exemplary embodiment of this application. This embodiment is described by using an example in which the method is performed by the first node device in the joint computing system. The method includes the following steps:

Step 301: Perform accuracy negotiation with the second node device to determine a modulus in a homomorphic encryption algorithm.

In the process of secure computation, each participant usually needs to perform multiple modulo operations (encryption, decryption and other data processing processes involve modulo operations). To facilitate subsequent encoding of a negative number and identification of the negative number, it is generally required that $|x|<n/2$ and $|y|<n/2$, x being the first plaintext data, y being the second plaintext data, and n being the modulus. In this case, the first node device and the second node device are required to perform accuracy negotiation to ensure that the two conditions are satisfied simultaneously. For example, the first node device generates n based on the first plaintext data and transmits n to the second node device. The second node device determines whether n satisfies $|y|<n/2$. If so, the second node device transmits confirmation information to the first node device, otherwise, the second node device re-determines n and transmits n to the first node device.

In practical applications, in order to prevent numerical overflow and considering the subsequent operations such as addition and multiplication of a plaintext or ciphertext need to be performed, it is necessary to ensure that n is large enough. Therefore, it may be required that $|x|<n/3$ and $|y|<n/3$.

Step 302: Perform homomorphic encryption processing on the first plaintext data based on the homomorphic encryption algorithm and the modulus, to generate the first ciphertext data.

The first node device generates a key based on the homomorphic encryption algorithm, and performs homomorphic encryption processing on the first plaintext data based on the key and the modulus according to the homomorphic encryption algorithm to generate the first ciphertext data. Similarly, when generating the second ciphertext data and the difference ciphertext data, the second node device likewise needs to use the modulus n for the modulo operation.

Step 303: Transmit encrypted data containing the first ciphertext data to a second node device, the second node device being configured to obtain second ciphertext data based on the encrypted data and second plaintext data and calculate difference ciphertext data based on the first ciphertext data and the second ciphertext data.

Specifically, the second node device is configured to perform negative number encoding based on at least one random number, the first ciphertext data, and the second ciphertext data, to obtain difference ciphertext data. The difference ciphertext data is a difference between a product ciphertext corresponding to the first plaintext data and the second ciphertext data, the product ciphertext is ciphertext data corresponding to a product of the first plaintext data and the random number, and the second ciphertext data is ciphertext data corresponding to a product of the second plaintext data and the random number. The random number is generated by the second node device or is jointly generated by the first node device and the second node device, the random number being a positive integer. Ciphertext processing is performed on the first ciphertext data by using a random positive integer, and the second ciphertext data is generated based on the random positive integer and the second plaintext data, which can not only ensure that the first plaintext data and the second plaintext data are equivalently encrypted, but also prevent the first node device from obtaining the second plaintext data based on a decrypted plaintext data difference.

Step 304: Receive the difference ciphertext data transmitted by the second node device.

Step 305: Decrypt the difference ciphertext data to obtain a positive and negative property of a difference between the first plaintext data and the second plaintext data.

Because the difference ciphertext data is the difference between the product ciphertext and the second ciphertext data, and both the product ciphertext and the second ciphertext data are the result of encrypting a product of the plaintext data and the random number, the decryption result obtained by decrypting the difference ciphertext data by the first node device is a product of the plaintext data difference and the random number, the plaintext data difference being the difference between the first plaintext data and the second plaintext data. Moreover, because the random number is a positive integer and does not affect the positive and negative property of the decryption result, even if the first node device cannot know the value of the random number, the first node device can also obtain the magnitude relationship between the first plaintext data and the second plaintext data.

For the detailed implementation of step 305 and step 304, reference may be made to step 203 and step 204, and details are not described again in this embodiment of this application.

Figure 4:
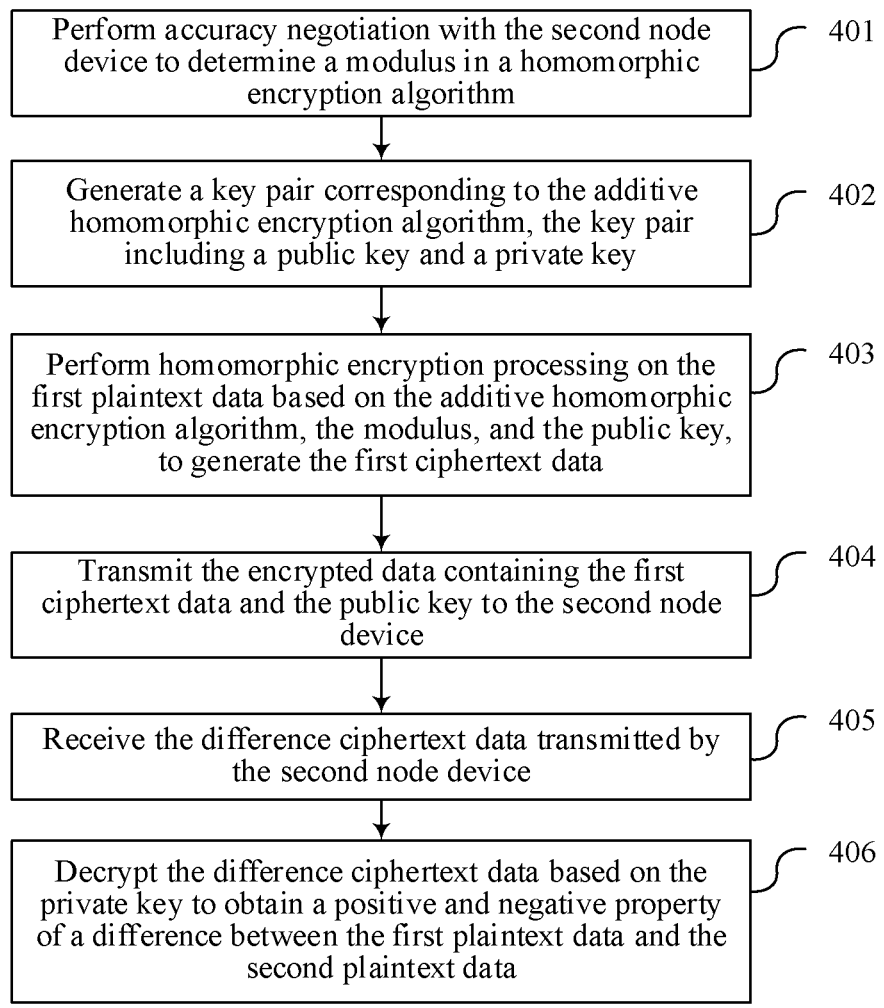
FIG. 4 is a flowchart of a secure multi-party computation method according to another exemplary embodiment of this application.

This application proposes three implementations for numerical comparison using secure multi-party computation method. The homomorphic encryption algorithm used in the first implementation is an additive homomorphic encryption algorithm. FIG. 4 is a flowchart of a secure multi-party computation method according to another exemplary embodiment of this application. This embodiment is described by using an example in which the method is performed by the first node device in the joint computing system and the homomorphic encryption algorithm is the additive homomorphic encryption algorithm. The method includes the following steps:

Step 401: Perform accuracy negotiation with the second node device to determine a modulus in a homomorphic encryption algorithm.

For the detailed implementation of step 401, reference may be made to step 301, and details are not described again in this embodiment of this application.

Step 402: Generate a key pair corresponding to the additive homomorphic encryption algorithm, the key pair including a public key and a private key.

The first node device encrypts the first plaintext data through the additive homomorphic encryption algorithm, and first generates a key pair of the additive homomorphic encryption algorithm, the key pair including a public key and a private key.

Exemplarily, the first node device encrypts the first plaintext data through the Paillier encryption algorithm, and first generates a public key and private key pair (pk, sk).

The foregoing example takes the Paillier encryption algorithm as an example for description. In an actual application process, other homomorphic encryption algorithms that encrypt and decrypt in the form of "public key+private key" can also be used, which is not limited in the embodiments of this application.

Step 403: Perform homomorphic encryption processing on the first plaintext data based on the additive homomorphic encryption algorithm, the modulus, and the public key, to generate the first ciphertext data.

The first node device uses the public key pk and the modulus n to perform homomorphic encryption processing on the possessing first plaintext data x to generate the first ciphertext data [x].

Exemplarily, the first node device adopts the Paillier encryption algorithm, which has two commonly used implementations. The encryption process and the corresponding decryption process are shown in Table 1:

|  | Solution 1 | Solution 2 |
| --- | --- | --- |
| Encryption | $c = g^m \times r^n \bmod n^2$ | $c = g^m \times g^{nr} \bmod n^2$ |
| Decryption | $m = \dfrac{L(c^\lambda \bmod n^2)}{L(g^\lambda \bmod n^2)} \bmod n$ | $m = \dfrac{L(c^\alpha \bmod n^2)}{L(g^\alpha \bmod n^2)} \bmod n$ |

In the table, m is the plaintext, c is the ciphertext, n is the modulus, g is the public key, and $\lambda$ and $\alpha$ are the private keys, r is the random number, and the function L is $(u)=(u-1)/n$.

Step 404: Transmit the encrypted data containing the first ciphertext data and the public key to the second node device.

The first node device transmits the encrypted data to the second node device, the encrypted data including the public key and the first ciphertext data.

In a possible implementation, the second node device generates a first random number p (p is a positive integer), and performs a modulo operation on the product (py) of the first random number and the second plaintext data based on the modulus, and assigns the modulo operation result py % n to py, that is, making py=py % n. Then, the second node device performs the homomorphic encryption processing on the modulo operation result based on the public key to generate the second ciphertext data [py]. Here, it is required that |py|<n/3, or |py|<n/2; and |px|<n/3, or |px|<n/2.

In order to ensure that the first plaintext data and the second plaintext data are subjected to the same encryption processing so as to achieve the homomorphic operation of ciphertext and plaintext, the second node device further needs to perform, when receiving the first ciphertext data [x], data processing on the first ciphertext data and calculate a first product ciphertext [px], the first product ciphertext [px] being a ciphertext corresponding to a product px of the first random number and the first plaintext data. For example, for the Paillier encryption algorithm, $[px]=[x]^p$ is satisfied.

After calculating the first product ciphertext and the second ciphertext data, the second node device calculates the difference ciphertext data [px]-[py]. In a possible implementation, the operation on the ciphertext data by the node device is an operation such as addition or multiplication based on position numbers, and thus the second node device may first calculate-[py], that is, performing negative number encoding on-[py] to make it positive. The second node device assigns the modulo operation result of the sum of the modulus n and the inverse-[px] of the first product ciphertext, that is, (n-[px]) % n, to -[py], that is, making-[py]= (n-[px]) % n. If it is judged that |px-py|>n/3 (or |px-py|>n/2) after subsequent decryption processing of the first node device, it is determined that the actual decryption result is to be px-py-n. Then, the second node device calculates the difference ciphertext data [px]-[py] based on the first product ciphertext and the updated inverse of the second ciphertext data. For example, for the Paillier encryption algorithm, [px]-[py]=[px] (-[py])=[px] (n-[px]) % n.

The second node device transmits the calculated difference ciphertext data [px]-[py] to the first node device.

Step 405: Receive the difference ciphertext data transmitted by the second node device.

For the detailed implementation of step 405, reference may be made to step 203, and details are not described again in this embodiment of this application.

Step 406: Decrypt the difference ciphertext data based on the private key to obtain a positive and negative property of a difference between the first plaintext data and the second plaintext data.

After receiving the difference ciphertext data [px]-[py], the first node device decrypts [px]-[py] based on the decryption manner of the additive homomorphic encryption algorithm, and calculates the decryption result px-py, that is, p (x-y). Because p is a random positive integer, the positive and negative property of p (x-y) is consistent with the positive and negative property of x-y, and the first node device determines the numerical comparison result based on p (x-y).

Figure 5:
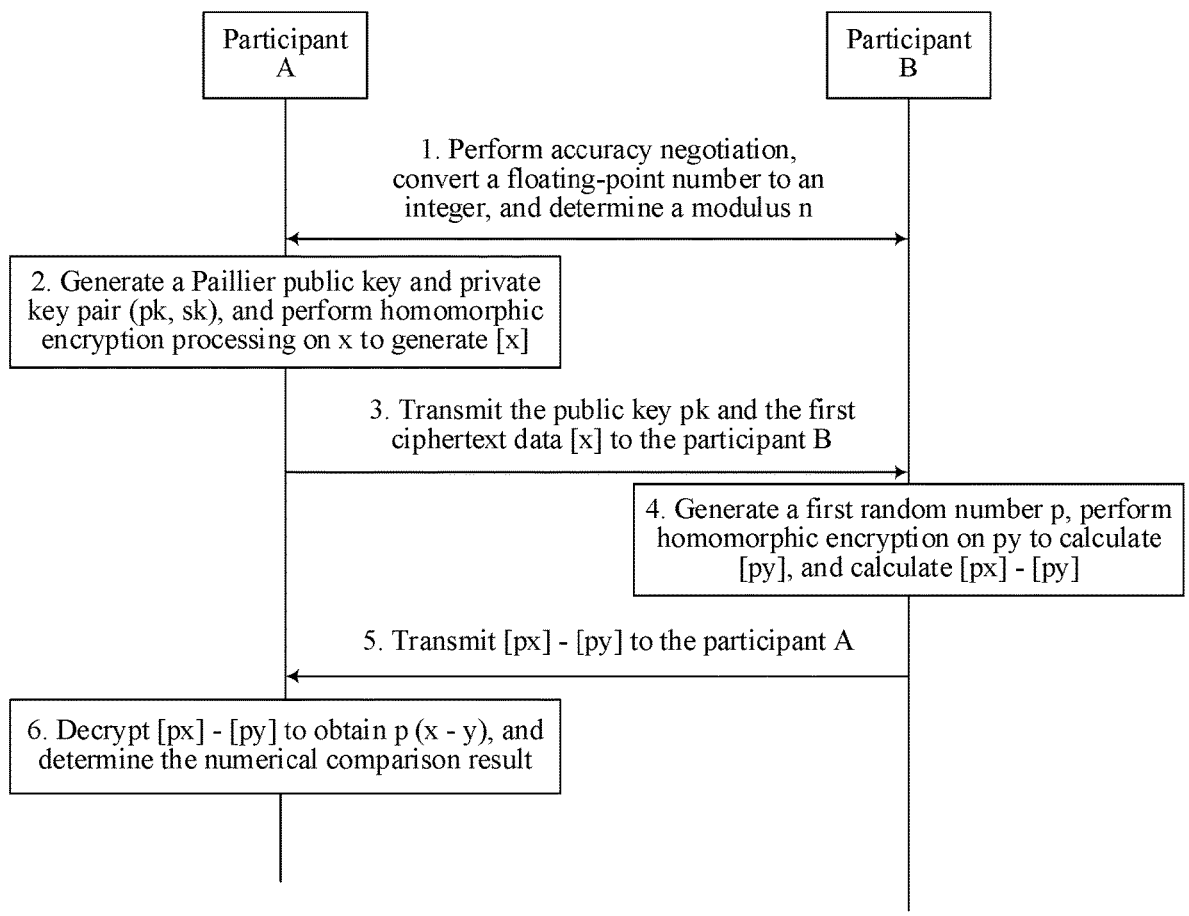
FIG. 5 is a flowchart of a secure multi-party computation method based on an additive homomorphic encryption algorithm according to an exemplary embodiment of this application.

Schematically, FIG. 5 shows the process in which a participant A and a participant B perform secure multi-party computation through the Paillier encryption algorithm: 1. the participant A and participant B perform accuracy negotiation, convert a floating-point number to an integer, and determine a modulus n; 2. the participant A generates a Paillier public key and private key pair (pk, sk), and performs homomorphic encryption processing on x to generate [x]; 3. the participant A transmits the public key pk and the first ciphertext data [x] to the participant B; 4. the participant B generates a first random number p, performs homomorphic encryption on py to calculate [py], and calculates [px]-[py]; 5. the participant B transmits [px]-[py] to the participant A; and 6. the participant A decrypts [px]-[py] to obtain p (x-y), and determines the numerical comparison result.

The foregoing example takes the Paillier encryption algorithm as an example for description. In an actual application process, other homomorphic encryption algorithms that encrypt and decrypt in the form of "public key+private key" can also be used, which is not limited in the embodiments of this application.

In this embodiment of this application, security of the magnitude comparison and equality testing protocol based on the additive homomorphic encryption is high, which can ensure that the data in each node device is not leaked, and improve the data security. And, each of the two node devices only needs to perform the accuracy negotiation once and data transmission and reception once, which reduces the number of times of communications and has low communication overhead and high computation efficiency.

Figure 6:
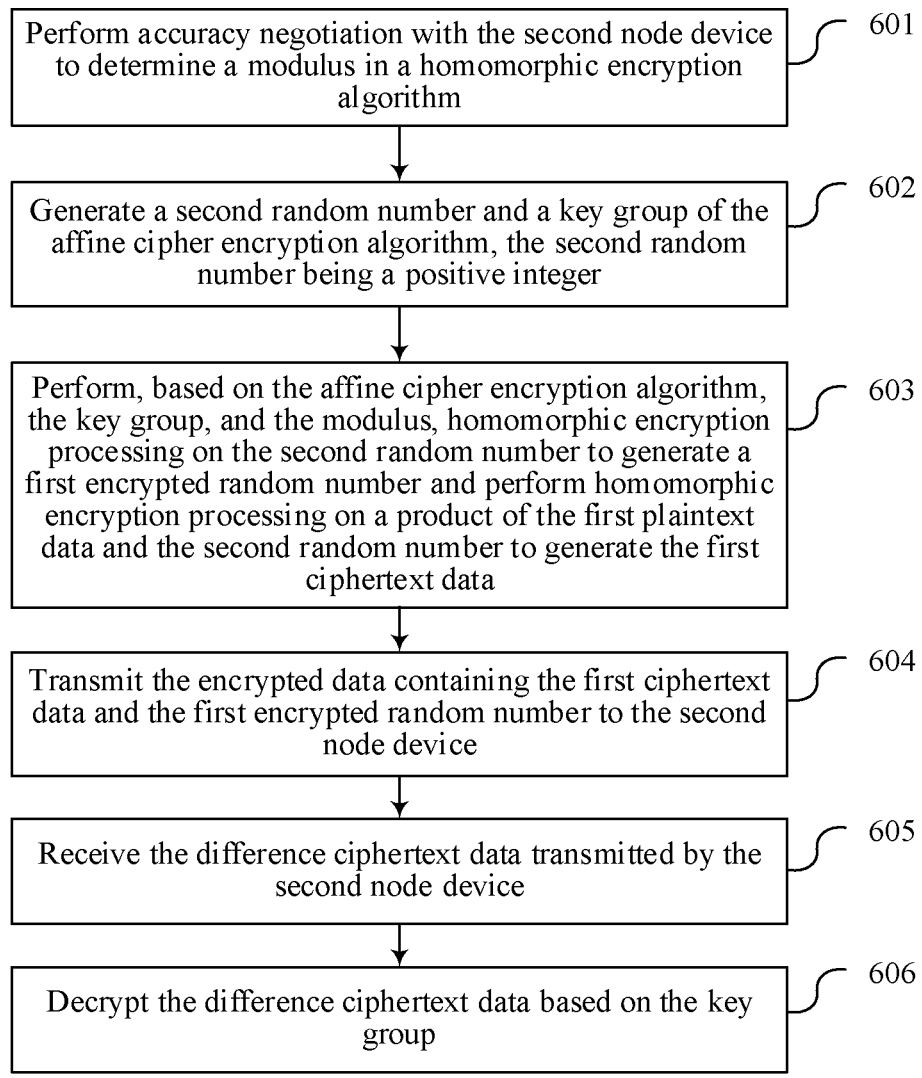
FIG. 6 is a flowchart of a secure multi-party computation method according to another exemplary embodiment of this application.

The homomorphic encryption algorithm used in a second implementation is an affine cipher encryption algorithm. FIG. 6 is a flowchart of a secure multi-party computation method according to another exemplary embodiment of this application. This embodiment is described by using an example in which the method is performed by the first node device in the joint computing system and the homomorphic encryption algorithm is the affine cipher encryption algorithm. The method includes the following steps:

Step 601: Perform accuracy negotiation with the second node device to determine a modulus in a homomorphic encryption algorithm.

For the detailed implementation of step 601, reference may be made to step 301, and details are not described again in this embodiment of this application.

Step 602: Generate a second random number and a key group of the affine cipher encryption algorithm, the second random number being a positive integer.

An encryption process of an affine cipher is an operation based on an affine transformation (also referred to as a linear transformation). For example, the device inputs a plaintext m, outputs a ciphertext c, where c=(a*m+b) % n or c=(a* (m+b)) % n. An encryption key is (a, b, n). * represents multiplication, % represents the modulo operation, and n is the modulus. In order to ensure the viability of the encryption algorithm (for example, to ensure that a decryption key exists and that the ciphertext corresponds one-to-one to the plaintext), it is required that a and n are coprime, that is, the greatest common divisor of a and n is required to be 1. The decryption key of the affine cipher is $(a^{-1}, b, n)$, $a^{-1}$ being a modular inverse of a, that is, $(a*a^{-1})\% n=1$. Generally, n is a very large prime number.

The affine cipher has an extremely good homomorphic characteristic, including addition on ciphertext, plaintext and ciphertext multiplication (commonly referred to as scalar multiplication, and required that b=0). The homomorphic characteristic means that an operation result in a ciphertext space can be directly converted into an operation result in a plaintext space. For example, ciphertext addition homomorphic refers to: dec (enc (m1)+enc (m2))=m1+m2; and scalar multiplication homomorphic refers to: dec (m1*enc(m2))=m1*m2.

Exemplarily, in this embodiment of this application, homomorphic encryption processing is performed by using randomized iterative affine cipher (RIAC). An iterative affine cipher (IAC) refers to an encryption algorithm that repeats affine encryption (that is, repeats affine transformation). For example, c1=(a1*m+b1) % n1, c2=(a2*c1+b2) % n2, c3=(a3*c2+b3) % n3 . . . Regardless of the number of times of repetition of the affine encryption, it is still an affine transformation (commonly referred to as a linear transformation), it is still an affine cipher, and it still meets the characteristic of addition homomorphic and scalar multiplication homomorphic b=0 is required in the scalar multiplication homomorphic).

The randomized iterative affine cipher is a cipher that adds noise on the basis of the iterative affine cipher to enhance the security of the affine cipher. For example, the process of adding noise to a plaintext is as follows: A random number r is generated and m1=(r*g) % n and m2=(m+r*h) % n are calculated, where h=(d*g) % n is required, and (g, h) is part of the encryption key, r*g>n, m+r*h>n, and the random number r is distributed randomly. Then, m1 and m2 are respectively subjected to iterative affine encryption. After iterative affine decryption, a denoising process is (m2−d*m1) % n. Therefore, d is part of the decryption key.

The significant advantage of RIAC is that the calculation amount is small, because only the linear transformation and the modulo operation are required and neither modeling nor inverse modulo operations is required. In addition, compared to the Paillier algorithm, the ciphertext of RIAC is shorter because it is an operation of modulo n and there is no need for an operation of model $n^2$ like the Paillier algorithm.

In a possible implementation, the first node device first generates a RIAC key group and a second random number θ (the second random number is a positive integer).

Step 603: Perform, based on the affine cipher encryption algorithm, the key group, and the modulus, homomorphic encryption processing on the second random number to generate a first encrypted random number and perform homomorphic encryption processing on a product of the first plaintext data and the second random number to generate the first ciphertext data.

The first node device respectively performs homomorphic encryption processing on the second random number θ and a product θx of the first plaintext data and the second random number based on the affine cipher encryption algorithm, the key group, and the modulus, to obtain a first encrypted random number [θ] and the first ciphertext data [θx].

Step 604: Transmit the encrypted data containing the first ciphertext data and the first encrypted random number to the second node device.

The first node device transmits encrypted data to the second node device, the encrypted data including the first ciphertext data and the first encrypted random number.

In a possible implementation, the second node device generates a third random number p (the third random number is a positive integer), performs a modulo operation on a product (py) of the third random number and the second plaintext data based on the modulus, and assigns a modulo operation result py % n to py, that is, making py=py % n. Then, the second node device generates the second ciphertext data [pθy] based on the modulo operation result py and the first encrypted random number [θ]. It can be seen that the second ciphertext data is ciphertext data corresponding to a product of the second random number θ, the third random number p, and the second plaintext data y. For example, for the RIAC encryption algorithm, [pθy]=py [θ] % n is satisfied. Here, it is required that |pθy|<n/3 and |pθx|<n/3 or |pθy|<n/2 and |pθx|<n/2.

In order to ensure that the first plaintext data and the second plaintext data are subjected to the same encryption processing so as to achieve the homomorphic operation of ciphertext and plaintext, the second node device further needs to perform, when receiving the first ciphertext data [θx], data processing on the first ciphertext data and calculate a second product ciphertext [pθx]. The second product ciphertext [pθx] is ciphertext data corresponding to a product of the second random number θ, the third random number p, and the first plaintext data x. The second node device calculates the second product ciphertext based on the encrypted data and the third random number. For example, for the RIAC encryption algorithm, [pθx]=p [θx] % n is satisfied.

After calculating the second product ciphertext and the second ciphertext data, the second node device calculates the difference ciphertext data [pθx]−[pθy]. In a possible implementation, the operation on the ciphertext data by the node device is an operation such as addition or multiplication based on positive numbers, and thus the second node device may first calculate −[pθy], that is, performing negative number encoding on−[pθy] to make it positive, the negative number encoding being to make−[pθy]=(n−[pθy]) % n. If it is judged that |pθx−pθy|>n/3 (or |pθx−pθy|>n/2) after subsequent decryption processing of the first node device, it is determined that the actual decryption result is to be pθx−pθy−n.

Then, the second node device calculates the difference ciphertext data [pθx]−[pθy]. For example, for the RIAC encryption algorithm, [pθx]−[pθy]=([pθx]+n−[pθy]) % n is satisfied.

The second node device transmits the calculated difference ciphertext data [pθx]−[pθy] to the first node device.

Step 605: Receive the difference ciphertext data transmitted by the second node device.

For the detailed implementation of step 605, reference may be made to step 203, and details are not described again in this embodiment of this application.

Step 606: Decrypt the difference ciphertext data based on the key group.

After receiving the difference ciphertext data [pθx]−[pθy], the first node device decrypts [pθx]−[pθy] based on the decryption manner of the affine cipher encryption algorithm, and calculates the decryption result pθx−pθy, that is, pθ (x−y). Because p and θ are random positive integers, the positive and negative property of pθ (x−y) is consistent with the positive and negative property of x−y, and the first node device determines the numerical comparison result based on pθ (x−y).

Figure 7:
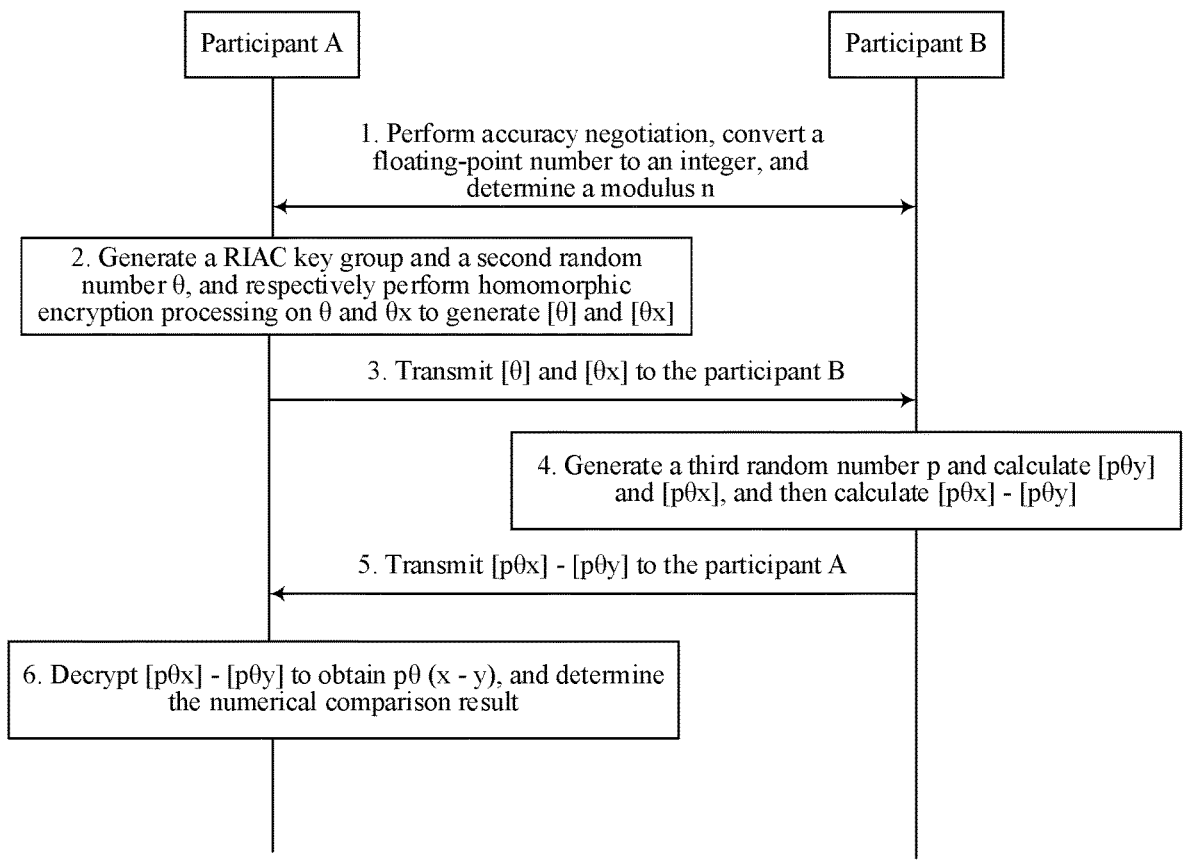
FIG. 7 is a flowchart of a secure multi-party computation method based on an affine cipher encryption algorithm according to an exemplary embodiment of this application.

Schematically, FIG. 7 shows the process in which a participant A and a participant B perform secure multi-party computation through the RIAC encryption algorithm: 1. the participant A and participant B perform accuracy negotiation, convert a floating-point number to an integer, and determine a modulus n; 2. the participant A generates a RIAC key group and a second random number θ, and respectively performs homomorphic encryption processing on θ and θx to generate [θ] and [θx]; 3. the participant A transmits [θ] and [θx] to the participant B; 4. the participant B generates a third random number p and calculates [pθy] and [pθx], and then calculates [pθx]−[pθy]; 5. the participant B transmits [pθx]−[pθy] to the participant A; and 6. the participant A decrypts [pθx]−[pθy] to obtain pθ (x−y), and determines the numerical comparison result.

In this embodiment of this application, for the magnitude comparison and equality testing protocol based on the affine cipher encryption, the computation complexity is low, and the coefficient of ciphertext expansion is small. Furthermore, in this protocol, different RIAC encryption key groups can be used for each magnitude comparison, which can enhance the security of the protocol, ensure that the data in each node device is not leaked, and improve data security. And, each of the two node devices only needs to perform the accuracy negotiation once and data transmission and reception once, which reduces the number of times of communications and has low communication overhead and high computation efficiency.

Figure 8:
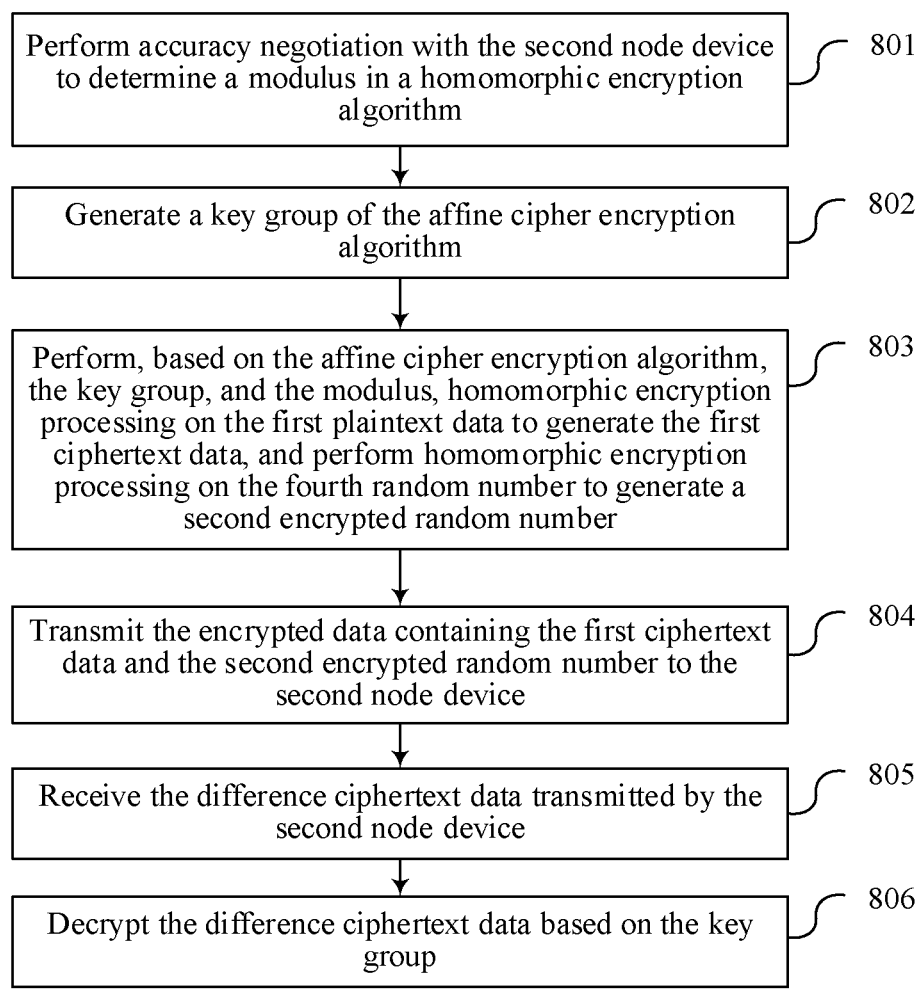
FIG. 8 is a flowchart of a secure multi-party computation method according to another exemplary embodiment of this application.

The homomorphic encryption algorithm used in a third implementation is an affine cipher encryption algorithm as well. FIG. 8 is a flowchart of a secure multi-party computation method according to another exemplary embodiment of this application. This embodiment is described by using an example in which the method is performed by the first node device in the joint computing system and the homomorphic encryption algorithm is the affine cipher encryption algorithm. The method includes the following steps:

Step 801: Perform accuracy negotiation with the second node device to determine a modulus in a homomorphic encryption algorithm.

For the detailed implementation of step 801, reference may be made to step 301, and details are not described again in this embodiment of this application.

Step 802: Generate a key group of the affine cipher encryption algorithm.

In another possible implementation, although the secure computation is performed through the affine cipher encryption algorithm similarly, the first node device is responsible only for generating a key group for the affine cipher encryption algorithm. In this embodiment of this application, random numbers are generated by the second node device, and one of the random numbers is transmitted to the first node device to obtain a random number ciphertext, so that the second node device converts the second plaintext data into the second ciphertext data by mathematical operation on the random number ciphertext and the second plaintext data without knowing the key.

Step 803: Perform, based on the affine cipher encryption algorithm, the key group, and the modulus, homomorphic encryption processing on the first plaintext data to generate the first ciphertext data, and perform homomorphic encryption processing on the fourth random number to generate a second encrypted random number.

Before step 803, the secure multi-party computation provided in this embodiment of this application further includes the following step:

receiving a fourth random number transmitted by the second node device.

After receiving a fourth random number θ, the first node device performs, based on the affine cipher encryption algorithm, the key group, and the modulus n, homomorphic encryption processing on the first plaintext data to generate the first ciphertext data [x], and performs homomorphic encryption processing on the fourth random number θ to generate a second encrypted random number [θ].

Step 804: Transmit the encrypted data containing the first ciphertext data and the second encrypted random number to the second node device.

The first node device transmits encrypted data to the second node device, the encrypted data including the first ciphertext data [x] and the second encrypted random number [θ].

In a possible implementation, after the accuracy negotiation, the second node device generates a fourth random number θ and a fifth random number p and transmits the fourth random number to the first node device, so that the first node device generates the second encrypted random number based on the fourth random number. The fourth random number and the fifth random number are positive integers. Meanwhile, the second node device assigns a modulo operation result of a product of the fourth random number and the fifth random number, that is, pθ% n, to pθ, that is, making pθ=pθ% n; and assigns a modulo operation result of a product of the fourth random number and the second plaintext data, that is, py % n, to py, that is, py=py % n.

After receiving the encrypted data, the second node device generates the second ciphertext data [pθy] based on the second encrypted random number, the fifth random number, and the second plaintext data, and generates the third product ciphertext [pθx] based on the fourth random number, the fifth random number, and the first ciphertext data. For example, for the RIAC encryption algorithm, [pθx]=p [x] % n and [pθy]=py [θ] % n are satisfied, where py is assigned py and pθ is assigned pθ.

After calculating the third product ciphertext and the second ciphertext data, the second node device generates difference ciphertext data, that is, [pθx]−[pθy], based on a difference between the third product ciphertext and the second ciphertext data. In a possible implementation, the operation on the ciphertext data by the node device is an operation such as addition or multiplication based on positive numbers. Therefore, the second node device may first calculate−[pθy], that is, performing negative number encoding on−[pθy] to make it positive, and assigns the modulo operation result of the sum of the modulus n and the inverse−[pθy] of the third product ciphertext, that is, (n−[pθy]) % n, to −[pθy], that is, making−[pθy]=(n−[pθy]) % n. Subsequently, the first node device obtains pθx−pθy by subtracting n correspondingly after decryption processing. Then, the second node device calculates the difference ciphertext data [pθx]−[pθy] based on the third product ciphertext and the updated inverse of the second ciphertext data. For example, for the RIAC encryption algorithm, [pθx]−[pθy]=([pθx]+n−[pθy]) % n is satisfied.

The second node device transmits the calculated difference ciphertext data [pθx]−[pθy] to the first node device.

Step 805: Receive the difference ciphertext data transmitted by the second node device.

Step 806: Decrypt the difference ciphertext data based on the key group.

For the detailed implementation of step 806 and step 805, reference may be made to step 605 and step 606, and details are not described again in this embodiment of this application.

Figure 9:
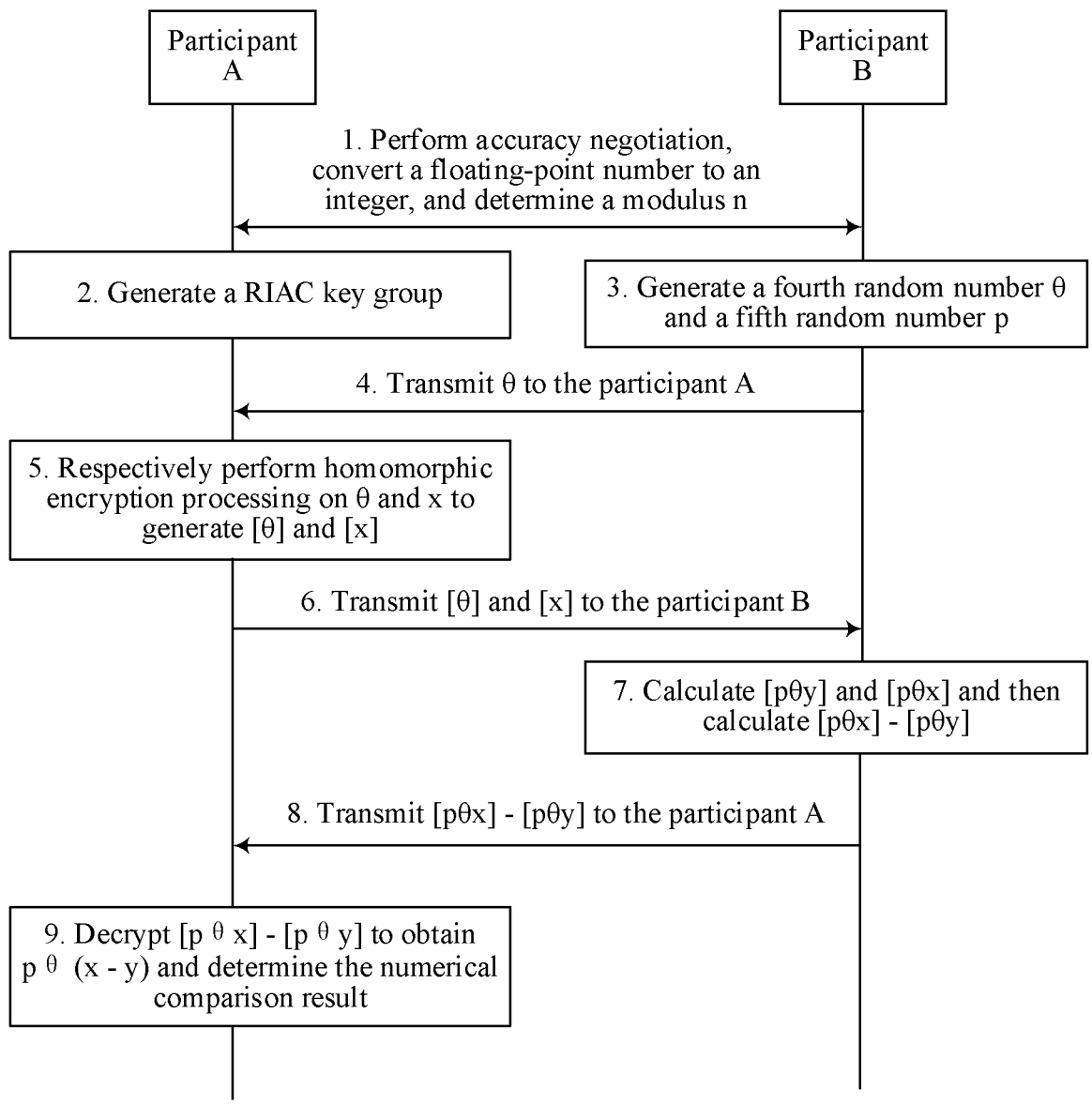
FIG. 9 is a flowchart of a secure multi-party computation method based on an affine cipher encryption algorithm according to an exemplary embodiment of this application.

Schematically, FIG. 9 shows the process in which a participant A and a participant B perform secure multi-party computation through the RIAC encryption algorithm: 1. the participant A and participant B perform accuracy negotiation, convert a floating-point number to an integer, and determine a modulus n; 2. the participant A generates a RIAC key group; 3. the participant B generates a fourth random number θ and a fifth random number p; 4. the participant B transmits θ to the participant A; 5. the participant A respectively performs homomorphic encryption processing on θ and x to generate [θ] and [x]; 6. the participant A transmits [θ] and [x] to the participant B; 7. the participant B calculates [pθy] and [pθx] and then calculates [pθx]−[pθy]; 8. the participant B transmits [pθx]−[pθy] to the participant A; and 9. the participant A decrypts [pθx]−[pθy] to obtain pθ (x−y) and determines the numerical comparison result. Here, there is no strict sequential order between step 2 and step 3.

In this embodiment of this application, for the magnitude comparison and equality testing protocol based on the affine cipher encryption, the computation complexity is low, and the coefficient of ciphertext expansion is small. Furthermore, in this protocol, different RIAC encryption key groups can be used for each magnitude comparison, which can enhance the security of the protocol, ensure that the data in each node device is not leaked, and improve data security. And, each of the two node devices only needs to perform the accuracy negotiation once and data transmission and reception once, which reduces the number of times of communications and has low communication overhead and high computation efficiency.

Figure 10:
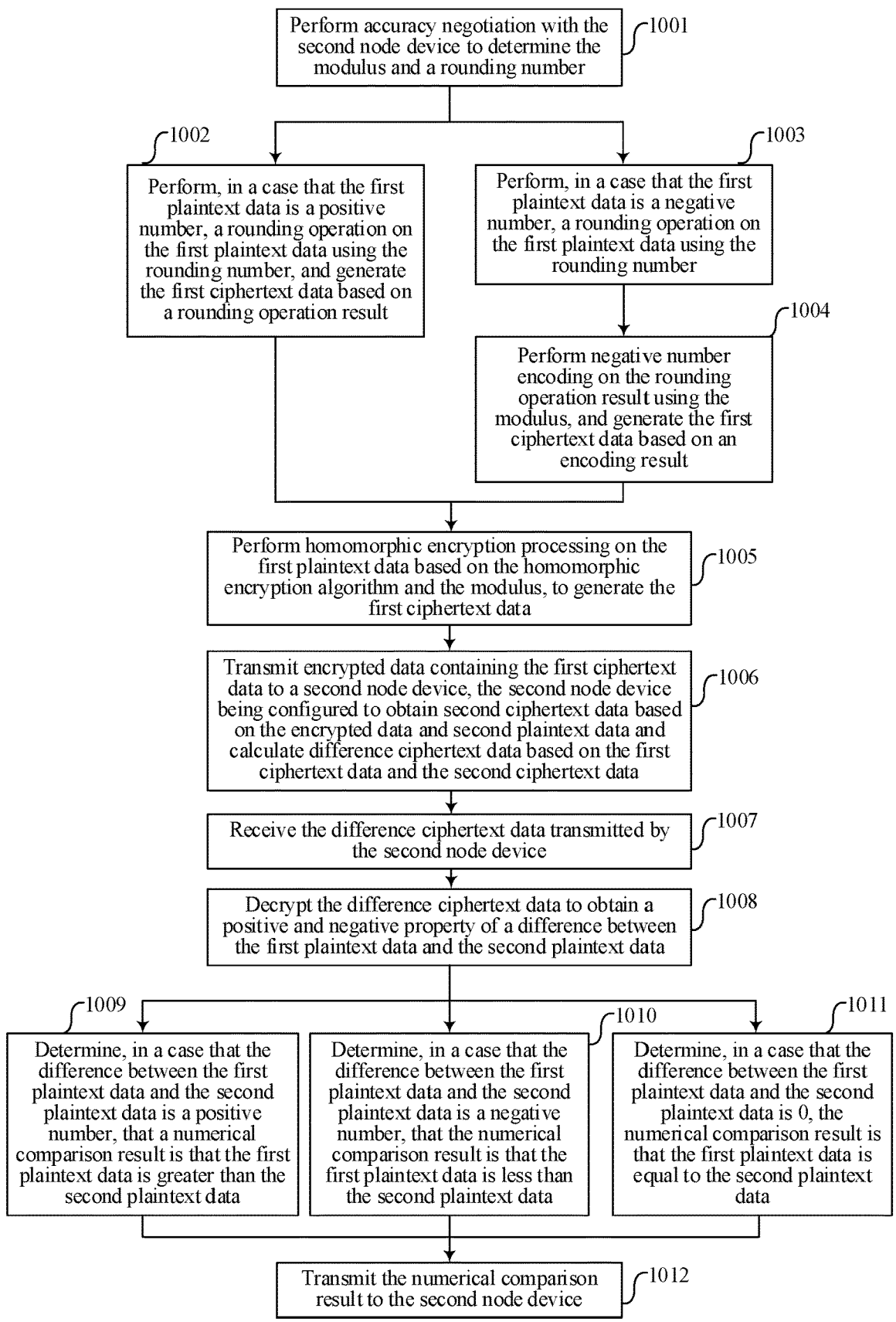
FIG. 10 is a flowchart of a secure multi-party computation method according to another exemplary embodiment of this application.

FIG. 10 is a flowchart of a secure multi-party computation method according to another exemplary embodiment of this application. This embodiment is described by using an example in which the method is performed by the first node device in the joint computing system. The method includes the following steps:

Step 1001: Perform accuracy negotiation with the second node device to determine the modulus and a rounding number.

When the first plaintext data and the second plaintext data are floating-point numbers, the first node device and the second node device respectively convert the first plaintext data and the second plaintext data into integers. The first node device and the second node device need to negotiate accuracy requirements, and then multiply the floating-point numbers by a large rounding number Q and round the product result to convert the floating-point numbers into integers, and for example, Q is selected to be $10^6$.

Step 1002: Perform, when the first plaintext data is a positive number, a rounding operation on the first plaintext data using the rounding number, and generate the first ciphertext data based on a rounding operation result.

When the first plaintext data and the second plaintext data are both positive numbers, the first node device and the second node device directly perform secure multi-party computation based on the first plaintext data and the second plaintext data after the rounding operation, and compare the magnitudes of the values.

Step 1003: Perform, when the first plaintext data is a negative number, a rounding operation on the first plaintext data using the rounding number.

Step 1004: Perform negative number encoding on the rounding operation result using the modulus, and generate the first ciphertext data based on an encoding result.

An absolute value of the first plaintext data is less than one half of the modulus, and an absolute value of the second plaintext data is less than one half of the modulus. The second node device is configured to perform a rounding operation on the second plaintext data based on the rounding number and perform negative number encoding on a rounding operation result that is less than 0.

When the first plaintext data is negative, the first node device further needs to perform negative number encoding on the first plaintext data based on the modulus n to convert the first plaintext data into a positive number, thereby performing an encryption operation and a decryption operation based on positive numbers.

In a possible implementation, if the first plaintext data x is less than 0, the first node device performs a modulo operation on the sum of the first plaintext data and the modulus, and assigns the modulo operation result to the first plaintext data, that is, making x=(x+n) % n.

In order to ensure that the first node device can identify negative integers from the result, it is generally required that |x|<n/2 and |y|<n/2, and all operations are operations of modular n. In this way, if an operation result c satisfies c≥n/2, the first node device can identify that a true value of c is a negative integer, and can obtain the true value of c by c=c−n.

Similarly, if the second plaintext data is negative, the second node device likewise performs the foregoing steps to perform negative number encoding processing on the second plaintext data.

Step 1005: Perform homomorphic encryption processing on the first plaintext data based on the homomorphic encryption algorithm and the modulus, to generate the first ciphertext data.

Step 1006: Transmit encrypted data containing the first ciphertext data to a second node device, the second node device being configured to obtain second ciphertext data based on the encrypted data and second plaintext data and calculate difference ciphertext data based on the first ciphertext data and the second ciphertext data.

Step 1007: Receive the difference ciphertext data transmitted by the second node device.

For the detailed implementation of step 1007 and step 1005, reference may be made to step 302 and step 304, and details are not described again in this embodiment of this application.

Step 1008: Decrypt the difference ciphertext data and determine a numerical comparison result based on a positive and negative property of a decryption result.

Step 1009: Determine, when the difference between the first plaintext data and the second plaintext data is a positive number, that a numerical comparison result is that the first plaintext data is greater than the second plaintext data.

Step 1010: Determine, when the difference between the first plaintext data and the second plaintext data is a negative number, that the numerical comparison result is that the first plaintext data is less than the second plaintext data.

Step 1011: Determine, when the difference between the first plaintext data and the second plaintext data is 0, the numerical comparison result is that the first plaintext data is equal to the second plaintext data.

After obtaining the decryption result, based on the magnitude relationship between the decryption result and the modulus n, the first node device judges whether it is required to additionally subtract the modulus n. For example, if p|x|<n/3 and p|y|<n/3 are determined during the accuracy negotiation at an early stage and the decryption result p (x−y) is greater than n/3, it is determined that x or y is subjected to negative number encoding. And, it is required to further subtract pn to perform the numerical comparison based on the positive and negative property of p (x−y−n).

Step 1012: Transmit the numerical comparison result to the second node device.

In a possible implementation, if the second node device needs to obtain a numerical comparison result, the first node device transmits the numerical comparison result to the second node device.

In this embodiment of this application, the value of modulus n is made greater than twice the first plaintext data and twice the second plaintext data through the accuracy negotiation. In this way, the numerical value in the subsequent encryption operation can be prevented from overflowing, the node device can directly perform negative number encoding using the modulus when the plaintext data is negative, and whether an original value is a negative number can be determined based on the magnitude relationship between the encoding result and the modulus, thereby reducing the complexity in the secure multi-party computation process.

The foregoing embodiments take the numerical comparison between the two participants as an example to illustrate the flow of the secure multi-party computation method. When there are three or more participants who need to perform the secure multi-party computation, every two of the node devices in the joint computing system perform the secure computation. For example, when a participant A possesses data z, a participant B possesses data y, a participant C possesses data z, and the three participants require numerical comparison and equality testing, the participant A and the participant B perform the steps of the foregoing secure multi-party computation method to obtain a magnitude relationship between x and y, then the participant B and the participant C perform the steps of the foregoing secure multi-party computation method to obtain a magnitude relationship between z and y, and if a magnitude relationship between x and z cannot be obtained, the participant A and the participant C perform the steps of the foregoing secure multi-party computation method to obtain the magnitude relationship between x and z.

Figure 11:
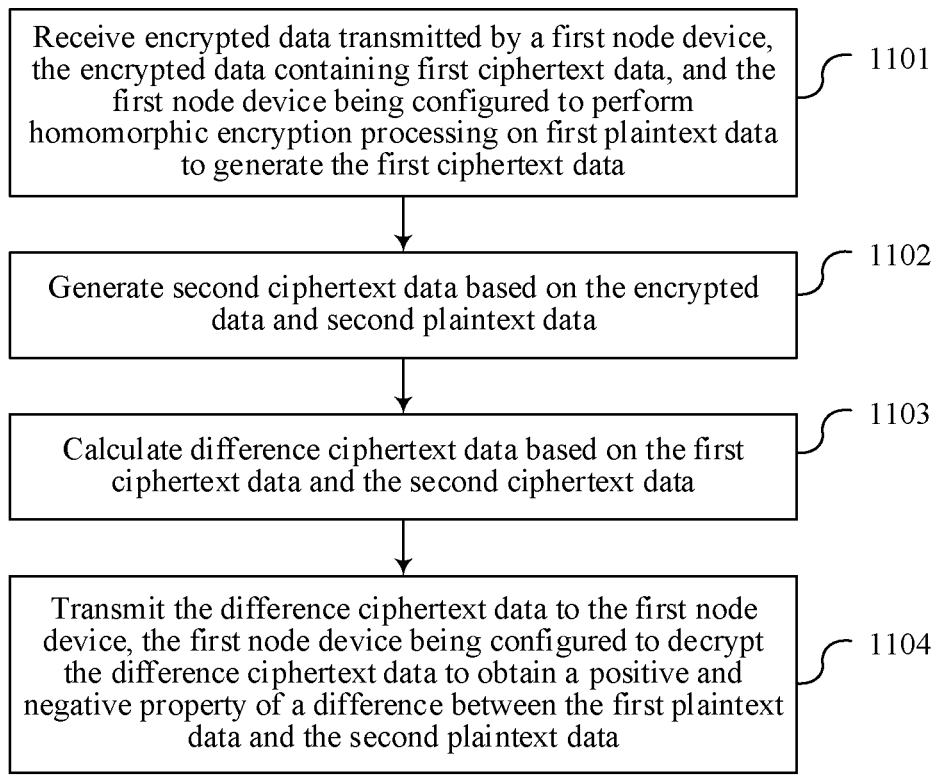
FIG. 11 is a flowchart of a secure multi-party computation method according to another exemplary embodiment of this application.

FIG. 11 is a flowchart of a secure multi-party computation method according to an exemplary embodiment of this application. This embodiment is described by using an example in which the method is performed by a second node device in a joint computing system. The method includes the following steps:

Step 1101: Receive encrypted data transmitted by a first node device, the encrypted data containing first ciphertext data, and the first node device being configured to perform homomorphic encryption processing on first plaintext data to generate the first ciphertext data.

In a possible implementation, the first node device stores first plaintext data, and the second node device stores second plaintext data. When the first node device and/or the second node device need to perform a magnitude comparison on the first plaintext data and the second plaintext data, in order to achieve that neither party discloses its own data to the other, the first node device first performs homomorphic encryption processing on the first plaintext data to generate first ciphertext data, and transmits the encrypted data containing the first ciphertext data to the second node device. The encrypted data further contains data such as a public key and a random number ciphertext, so that the second node device can encrypt the second plaintext data correspondingly.

Step 1102: Generate second ciphertext data based on the encrypted data and second plaintext data.

The second node device encrypts the second plaintext data based on the received encrypted data to obtain the second ciphertext data. In a possible implementation, the second node device generates a random positive integer, and the second ciphertext data is ciphertext data corresponding to a product of the second plaintext data and the random positive integer, to prevent the first node device from obtaining the second plaintext data based on the difference ciphertext data and the first ciphertext data.

Step 1103: Calculate difference ciphertext data based on the first ciphertext data and the second ciphertext data.

After operating the second plaintext data and the random number in a preset manner, the second node device further needs to operates the first ciphertext data correspondingly to obtain ciphertext data corresponding to a product of the first plaintext data and the random positive integer, that is, a ciphertext product. Then, the second node device calculates difference ciphertext data based on the ciphertext product and the second ciphertext data.

Step 1104: Transmit the difference ciphertext data to the first node device, the first node device being configured to decrypt the difference ciphertext data to obtain a positive and negative property of a difference between the first plaintext data and the second plaintext data.

After calculating the difference ciphertext data, the second node device transmits the difference ciphertext data to the first node device, and the first node device decrypts the difference ciphertext data and determines the numerical comparison result. The second node device receives the numerical comparison result transmitted by the first node device to determine a magnitude relationship between the first plaintext data and the second plaintext data.

For specific steps performed by the first node device in this embodiment of this application, reference may be made to the embodiments described above, and details are not described again in this embodiment of this application.

In conclusion, in this embodiment of this application, the data transmitted by both node devices to each other is ciphertext data, and difference ciphertext data is decrypted through a homomorphic encryption algorithm to obtain a positive and negative property of a difference between first plaintext data and second plaintext data. In this way, magnitude comparison and equality testing are realized simultaneously under the premise that neither participant discloses its own data to the other, nor does it rely on a trusted third party. Compared with the computation method in the related art, each of the two node devices only needs to perform data transmission and reception once, which reduces the number of times of communications, has low communication overhead and high computation efficiency, and enables the magnitude comparison and the equality testing to be performed simultaneously.

In a possible implementation, in order to perform the magnitude comparison without leaking data of each participant, the second node device performs data processing on the first ciphertext data and the second plaintext data with a random positive integer, and step 1103 specifically includes the following steps:

performing negative number encoding based on at least one random number, the first ciphertext data, and the second ciphertext data, to obtain difference ciphertext data.

The difference ciphertext data is a difference between a product ciphertext corresponding to the first plaintext data and the second ciphertext data, the product ciphertext is ciphertext data corresponding to a product of the first plaintext data and the random number, and the second ciphertext data is ciphertext data corresponding to a product of the second plaintext data and the random number. The random number is generated by the second node device or is jointly generated by the first node device and the second node device, the random number being a positive integer.

Because the difference ciphertext data is the difference between the product ciphertext and the second ciphertext data, and both the product ciphertext and the second ciphertext data are the result of encrypting a product of the plaintext data and the random number, the decryption result obtained by decrypting the difference ciphertext data by the first node device is a product of the plaintext data difference and the random number, the plaintext data difference being the difference between the first plaintext data and the second plaintext data.

In a schematic example, because the method ensures that the data is not out of the domain and does not require additional third-participant to be involved in the computation, the method can be applied to numerical comparisons in the field of finance, which reduces risk. For example, a bank and e-commerce companies respectively possess different data of the same customers, where the bank possesses asset data of the customer, and the e-commerce companies possess historical shopping data of the customers, and the bank needs to acquire shopping preferences of the user and compare the cost amounts of the same user at two e-commerce companies. In this scenario, each e-commerce company performs secure multi-party computation based on its own user shopping data. The foregoing secure multi-party computation method is used between every two of e-commerce companies to determine the level of user consumption in different e-commerce companies without knowing the user data of the other. The e-commerce company transmits a secure multi-party computation result to the bank to enable the bank to predict products that match the user preferences, recommend investment products that match the user preferences, etc. In this way, the bank can predict and analyze the user behavior while ensuring that the data is not out of the domain.

Figure 12:
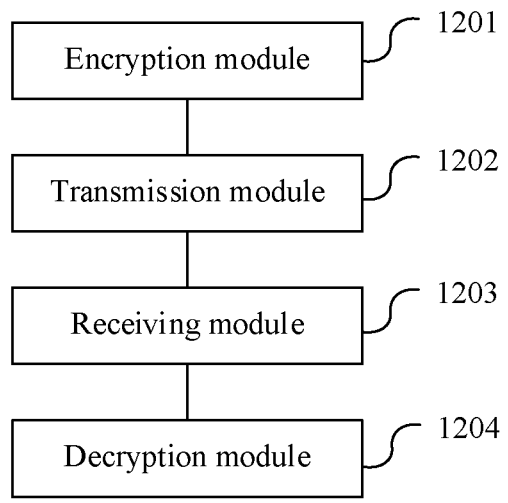
FIG. 12 is a structural block diagram of a secure multi-party computation apparatus according to an exemplary embodiment of this application.

FIG. 12 is a structural block diagram of a secure multi-party computation apparatus in a first node device according to an exemplary embodiment of this application. The apparatus includes the following structures:

an encryption module 1201, configured to perform homomorphic encryption processing on first plaintext data to generate first ciphertext data;

a transmission module 1202, configured to transmit encrypted data containing the first ciphertext data to a second node device, the second node device being configured to obtain second ciphertext data based on the encrypted data and second plaintext data and calculate difference ciphertext data based on the first ciphertext data and the second ciphertext data;

a receiving module 1203, configured to receive the difference ciphertext data transmitted by the second node device; and a decryption module 1204, configured to decrypt the difference ciphertext data to obtain a positive and negative property of a difference between the first plaintext data and the second plaintext data.

Optionally, the apparatus further includes:

a negotiation module, configured to perform accuracy negotiation with the second node device to determine a modulus in a homomorphic encryption algorithm; and the encryption module 1201 is further configured to perform homomorphic encryption processing on the first plaintext data based on the homomorphic encryption algorithm and the modulus, to generate the first ciphertext data.

Optionally, the homomorphic encryption algorithm is an additive homomorphic encryption algorithm;

the encryption module 1201 is further configured to:

generate a key pair corresponding to the additive homomorphic encryption algorithm, the key pair including a public key and a private key; and perform homomorphic encryption processing on the first plaintext data based on the additive homomorphic encryption algorithm, the modulus, and the public key, to generate the first ciphertext data;

the transmission module 1202 is further configured to transmit the encrypted data containing the first ciphertext data and the public key to the second node device; and the decryption module 1204 is further configured to decrypt the difference ciphertext data based on the private key.

Optionally, the second node device is configured to: generate a first random number; perform a modulo operation on a product of the first random number and the second plaintext data based on the modulus; perform homomorphic encryption processing on a modulo operation result based on the public key to generate the second ciphertext data; and calculate a first product ciphertext and generate the difference ciphertext data based on the first ciphertext data and the first random number, the difference ciphertext data being a difference between the first product ciphertext and the second ciphertext data, and the first product ciphertext being a ciphertext corresponding to a product of the first random number and the first plaintext data, the first random number being a positive integer.

Optionally, the homomorphic encryption algorithm is an affine cipher encryption algorithm;

the encryption module 1201 is further configured to:

generate a second random number and a key group of the affine cipher encryption algorithm, the second random number being a positive integer; and perform, based on the affine cipher encryption algorithm, the key group, and the modulus, homomorphic encryption processing on the second random number to generate a first encrypted random number, and perform homomorphic encryption processing on a product of the first plaintext data and the second random number to generate the first ciphertext data;

the transmission module 1202 is further configured to transmit the encrypted data containing the first ciphertext data and the first encrypted random number to the second node device; and the decryption module 1204 is further configured to decrypt the difference ciphertext data based on the key group.

Optionally, the second node device is configured to: generate a third random number; perform a modulo operation on a product of the third random number and the second plaintext data based on the modulus; generate the second ciphertext data based on a modulo operation result and the first encrypted random number; generate a second product ciphertext based on the first ciphertext data and the third random number; and obtain the difference ciphertext data based on a difference between the second product ciphertext and the second ciphertext data, the second ciphertext data being ciphertext data corresponding to a product of the second random number, the third random number, and the second plaintext data, and the second product ciphertext being ciphertext data corresponding to a product of the second random number, the third random number, and the first plaintext data, the third random number being a positive integer.

Optionally, the homomorphic encryption algorithm is an affine cipher encryption algorithm, and the second node device is configured to generate a fourth random number and a fifth random number after accuracy negotiation is performed, and transmit the fourth random number to the first node device, the fourth random number and the fifth random number being positive integers;

the encryption module 1201 is further configured to:
generate a key group of the affine cipher encryption algorithm; and
perform, based on the affine cipher encryption algorithm, the key group, and the modulus, homomorphic encryption processing on the first plaintext data to generate the first ciphertext data, and perform homomorphic encryption processing on the fourth random number to generate a second encrypted random number;
the transmission module 1202 is further configured to transmit the encrypted data containing the first ciphertext data and the second encrypted random number to the second node device; and
the decryption module 1204 is further configured to decrypt the difference ciphertext data based on the key group.

Optionally, the second node device is configured to: generate the second ciphertext data based on the second encrypted random number, the fifth random number, and the second plaintext data; generate a third product ciphertext based on the fourth random number, the fifth random number, and the first ciphertext data; and generate the difference ciphertext data based on a difference between the third product ciphertext and the second ciphertext data, the second ciphertext data being ciphertext data corresponding to a product of the fourth random number, the fifth random number, and the second plaintext data, and the third product ciphertext being ciphertext data corresponding to a product of the fourth random number, the fifth random number, and the first plaintext data.

Optionally, the second node device is configured to perform negative number encoding based on at least one random number, the first ciphertext data, and the second ciphertext data, to obtain difference ciphertext data, the difference ciphertext data being a difference between a product ciphertext corresponding to the first plaintext data and the second ciphertext data, the product ciphertext being ciphertext data corresponding to a product of the first plaintext data and the random number, the second ciphertext data being ciphertext data corresponding to a product of the second plaintext data and the random number, and the random number being generated by the second node device or being jointly generated by the first node device and the second node device, the random number being a positive integer; and
the decryption result is a product of a plaintext data difference and the random number, the plaintext data difference being a difference between the first plaintext data and the second plaintext data.

Optionally, the negotiation module is further configured to perform accuracy negotiation with the second node device to determine the modulus and a rounding number; and
the apparatus further includes a processing module, configured to:
perform, when the first plaintext data is a positive number, a rounding operation on the first plaintext data using the rounding number, and generate the first ciphertext data based on a rounding operation result; and
perform, when the first plaintext data is a negative number, a rounding operation on the first plaintext data using the rounding number; and perform negative number encoding on a rounding operation result using the modulus, and generate the first ciphertext data based on an encoding result,
an absolute value of the first plaintext data being less than one half of the modulus, an absolute value of the second plaintext data being less than one half of the modulus, and the second node device being configured to perform a rounding operation on the second plaintext data based on the rounding number and perform negative number encoding on a rounding operation result that is less than 0.

Optionally, the decryption module is further configured to:
determine, when the decryption result is a positive number, that a numerical comparison result is that the first plaintext data is greater than the second plaintext data;
determine, when the decryption result is a negative number, that the numerical comparison result is that the first plaintext data is less than the second plaintext data; and
determine, when the decryption result is 0, the numerical comparison result is that the first plaintext data is equal to the second plaintext data.

Optionally, the transmission module is further configured to:
transmit the numerical comparison result to the second node device.

Figure 13:
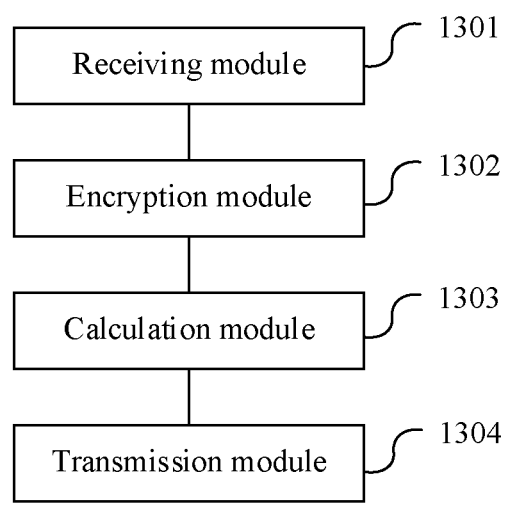
FIG. 13 is a structural block diagram of a secure multi-party computation apparatus according to an exemplary embodiment of this application.

FIG. 13 is a structural block diagram of a secure multi-party computation apparatus in a second node device according to an exemplary embodiment of this application. The apparatus includes the following structures:
a receiving module 1301, configured to receive encrypted data transmitted by a first node device, the encrypted data containing first ciphertext data, and the first node device being configured to perform homomorphic encryption processing on first plaintext data to generate the first ciphertext data;
an encryption module 1302, configured to generate second ciphertext data based on the encrypted data and second plaintext data;
a calculation module 1303, configured to calculate difference ciphertext data based on the first ciphertext data and the second ciphertext data; and
a transmission module 1304, configured to transmit the difference ciphertext data to the first node device, the first node device being configured to decrypt the difference ciphertext data to obtain a positive and negative property of a difference between the first plaintext data and the second plaintext data.

Optionally, the calculation module 1303 is further configured to:
perform negative number encoding based on at least one random number, the first ciphertext data, and the second ciphertext data, to obtain difference ciphertext data, the difference ciphertext data being a difference between a product ciphertext corresponding to the first plaintext data and the second ciphertext data, the product ciphertext being ciphertext data corresponding to a product of the first plaintext data and the random number, the second ciphertext data being ciphertext data corresponding to a product of the second plaintext data and the random number, and the random number being generated by the second node device or being jointly generated by the first node device and the second node device, the random number being a positive integer; and
the decryption result is a product of a plaintext data difference and the random number, the plaintext data difference being a difference between the first plaintext data and the second plaintext data.

In conclusion, in this embodiment of this application, the data transmitted by both node devices to each other is ciphertext data, and difference ciphertext data is decrypted through a homomorphic encryption algorithm to obtain a positive and negative property of a difference between first plaintext data and second plaintext data. In this way, magnitude comparison and equality testing are realized simultaneously under the premise that neither participant discloses its own data to the other, nor does it rely on a trusted third party. Compared with the computation method in the related art, each of the two node devices only needs to perform data transmission and reception once, which reduces the number of times of communications, has low communication overhead and high computation efficiency, and enables the magnitude comparison and the equality testing to be performed simultaneously.

Figure 14:
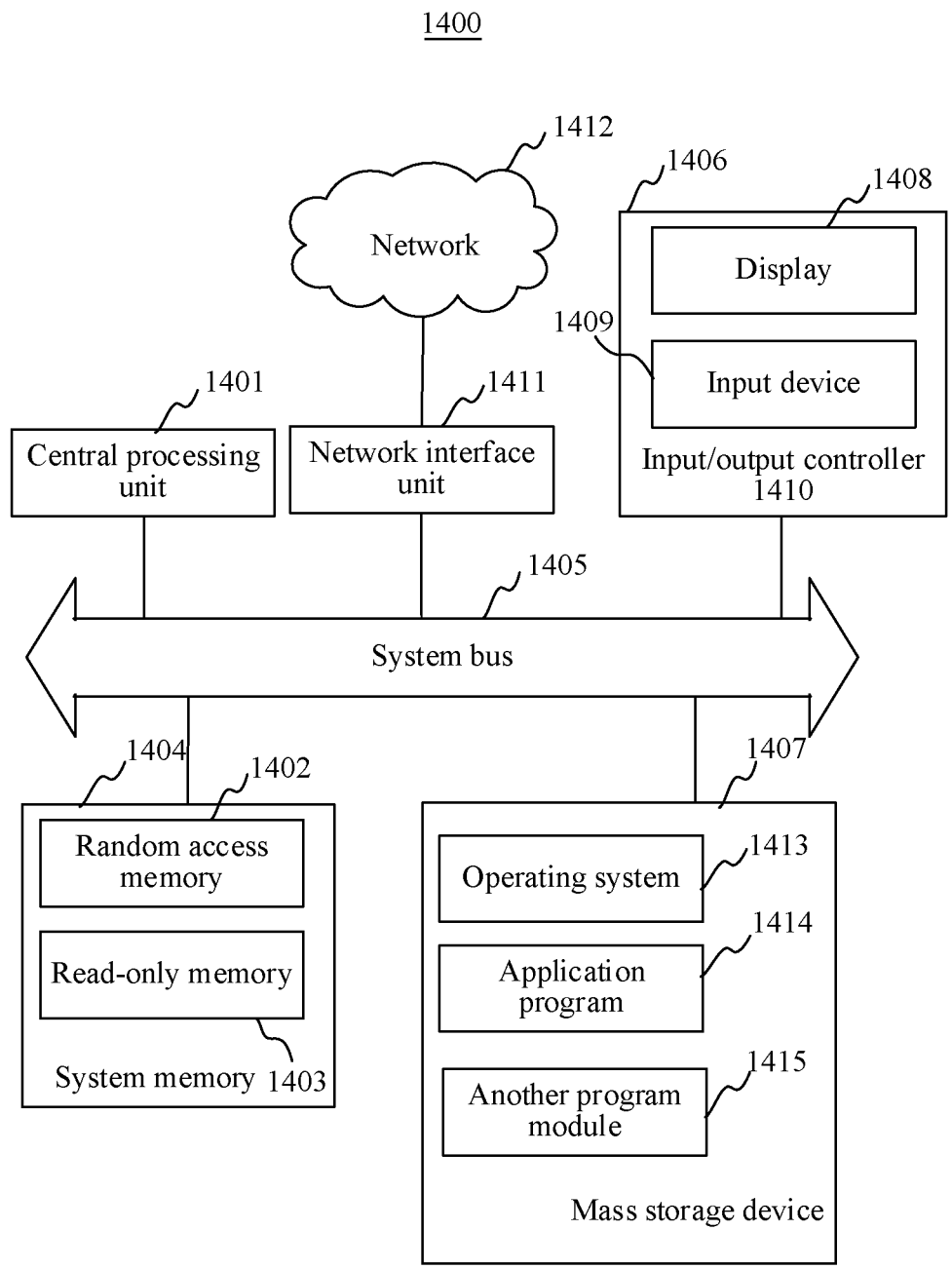
FIG. 14 is a structural block diagram of a computer device according to an exemplary embodiment of this application.

FIG. 14 is a schematic structural diagram of a computer device according to an embodiment of this application.

The computer device 1400 includes a central processing unit (CPU) 1401, a system memory 1404 including a random access memory (RAM) 1402 and a read-only memory (ROM) 1403, and a system bus 1405 connecting the system memory 1404 to the CPU 1401. The computer device 1400 further includes a basic input/output (I/O) controller 1406 assisting in transmitting information between components in a computer, and a mass storage device 1407 configured to store an operating system 1413, an application program 1414, and another program module 1415.

The basic I/O system 1406 includes a display 1408 configured to display information, and an input device 1409 such as a mouse and a keyboard for a user to input information. The display 1408 and the input device 1409 are both connected to the CPU 1401 through an input/output controller 1410 connected to the system bus 1405. The basic I/O system 1406 may further include the input/output controller 1410 for receiving and processing input from a plurality of other devices such as a keyboard, a mouse, an electronic stylus, or the like. Similarly, the I/O controller 1410 further provides an output to a display screen, a printer, or another type of output device.

The mass storage device 1407 is connected to the CPU 1401 through a mass storage controller (not shown) connected to the system bus 1405. The mass storage device 1407 and an associated computer-readable medium provide non-volatile storage for the computer device 1400. That is, the mass storage device 1407 may include a computer-readable medium (not shown) such as a hard disk or a compact disc ROM (CD-ROM) drive.

In general, the computer-readable medium may include a computer storage medium and a communication medium. The computer storage medium includes volatile and nonvolatile, removable and non-removable media that are configured to store information such as computer-readable instructions, data structures, program modules, or other data and that are implemented by using any method or technology. The computer storage medium includes a RAM, a ROM, an erasable programmable ROM (EPROM), a flash memory or another solid-state storage technology, a CD-ROM, a digital versatile disc (DVD) or another optical storage, a magnetic cassette, a magnetic tape, or a magnetic disk storage or another magnetic storage device. Certainly, those skilled in the art may learn that the computer storage medium is not limited to the above. The foregoing system memory 1404 and mass storage device 1407 may be collectively referred to as a memory.

According to the embodiments of this application, the computer device 1400 may further be connected, through a network such as the Internet, to a remote computer on the network. That is, the computer device 1400 may be connected to a network 1412 by using a network interface unit 1411 connected to the system bus 1405, or may be connected to another type of network or a remote computer system (not shown) by using a network interface unit 1411.

The memory further includes at least one instruction, at least one program, a code set, or an instruction set. The at least one instruction, the at least one program, the code set, or the instruction set is stored in the memory and is configured to be executed by one or more processors to implement the foregoing secure multi-party computation method.

An embodiment of this application further provides a computer-readable storage medium, storing at least one instruction. The at least one instruction is loaded and executed by a processor to implement the secure multi-party computation method described in the foregoing embodiments.

According to an aspect of this application, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the secure multi-party computation method provided in the optional implementations in the foregoing aspects.

The information (including but not limited to user device information, user personal information, and the like), data (including but not limited to data used for analysis, stored data, displayed data, and the like) and signals involved in this application are authorized by the user or fully authorized by the parties, and collection, use, and processing of relevant data need to comply with relevant laws, regulations, and standards of relevant countries and regions. For example, data used by the various node devices in model training and model reasoning phases in this application is obtained with full authorization.

The foregoing descriptions are merely optional embodiments of this application, but are not intended to limit this application. Any modification, equality replacement, or improvement made within the spirit and principle of this application shall fall within the protection scope of this application.

What is claimed is:

1. A secure multi-party computation method, performed by a first node device in a joint computing system, the method comprising:
  performing computation accuracy negotiation with a second node device to determine a modulus in a homomorphic encryption algorithm;
  performing homomorphic encryption processing on first plaintext data based on the homomorphic encryption algorithm and the modulus to generate first ciphertext data;
  transmitting encrypted data comprising the first ciphertext data to the second node device, the second node device being configured to obtain second ciphertext data based on the encrypted data and second plaintext data and calculate difference ciphertext data based on the first ciphertext data and the second ciphertext data;
  receiving the difference ciphertext data transmitted by the second node device; and
  decrypting the difference ciphertext data to obtain a positive or negative property of a difference between the first plaintext data and the second plaintext data.

2. The method according to claim 1, wherein the homomorphic encryption algorithm is an additive homomorphic encryption algorithm;

the performing homomorphic encryption processing on the first plaintext data based on the homomorphic encryption algorithm and the modulus, to generate the first ciphertext data comprises:
  generating a key pair corresponding to the additive homomorphic encryption algorithm, the key pair comprising a public key and a private key; and
  performing homomorphic encryption processing on the first plaintext data based on the additive homomorphic encryption algorithm, the modulus, and the public key, to generate the first ciphertext data.

3. The method according to claim 2, wherein the transmitting encrypted data comprising the first ciphertext data to a second node device comprises:
  transmitting the encrypted data comprising the first ciphertext data and the public key to the second node device.

4. The method according to claim 2, wherein the decrypting the difference ciphertext data comprises:
  decrypting the difference ciphertext data based on the private key.

5. The method according to claim 1, wherein the homomorphic encryption algorithm is an affine cipher encryption algorithm;
  the performing homomorphic encryption processing on the first plaintext data based on the homomorphic encryption algorithm and the modulus, to generate the first ciphertext data comprises:
  generating a second random number and a key group of the affine cipher encryption algorithm, the second random number being a positive integer; and
  performing, based on the affine cipher encryption algorithm, the key group, and the modulus, homomorphic encryption processing on the second random number to generate a first encrypted random number, and performing homomorphic encryption processing on a product of the first plaintext data and the second random number to generate the first ciphertext data;
  the transmitting encrypted data comprising the first ciphertext data to the second node device comprises:
  transmitting the encrypted data comprising the first ciphertext data and the first encrypted random number to the second node device; and
  the decrypting the difference ciphertext data comprises:
  decrypting the difference ciphertext data based on the key group.

6. The method according to claim 1, wherein the homomorphic encryption algorithm is an affine cipher encryption algorithm, and the second node device is configured to generate a fourth random number and a fifth random number after accuracy negotiation is performed, and transmit the fourth random number to the first node device, the fourth random number and the fifth random number being positive integers;
  the performing homomorphic encryption processing on the first plaintext data based on the homomorphic encryption algorithm and the modulus, to generate the first ciphertext data comprises:
  generating a key group of the affine cipher encryption algorithm; and
  performing, based on the affine cipher encryption algorithm, the key group, and the modulus, homomorphic encryption processing on the first plaintext data to generate the first ciphertext data, and performing homomorphic encryption processing on the fourth random number to generate a second encrypted random number;
  the transmitting encrypted data comprising the first ciphertext data to the second node device comprises:
  transmitting the encrypted data comprising the first ciphertext data and the second encrypted random number to the second node device; and
  the decrypting the difference ciphertext data comprises:
  decrypting the difference ciphertext data based on the key group.

7. The method according to claim 1, the performing computation accuracy negotiation with the second node device comprises:
  performing computation accuracy negotiation with the second node device to determine the modulus and a rounding number; and
  after the performing computation accuracy negotiation with the second node device to determine a modulus in the homomorphic encryption algorithm, the method further comprises:
  performing, when the first plaintext data is a positive number, a rounding operation on the first plaintext data using the rounding number, and generating the first ciphertext data based on a rounding operation result;
  performing, when the first plaintext data is a negative number, a rounding operation on the first plaintext data using the rounding number; and
  performing negative number encoding on the rounding operation result using the modulus, and generating the first ciphertext data based on an encoding result,
  an absolute value of the first plaintext data being less than one half of the modulus, an absolute value of the second plaintext data being less than one half of the modulus, and the second node device being configured to perform a rounding operation on the second plaintext data based on the rounding number and perform negative number encoding on a rounding operation result that is less than 0.

8. A non-transitory computer-readable storage medium for storing a plurality of computer programs, wherein the plurality of computer programs is loaded and executed by at least one processor to implement the secure multi-party computation steps according to claim 1.

9. A secure multi-party computation method, performed by a first node device in a joint computing system, the method comprising:
  performing homomorphic encryption processing on first plaintext data to generate first ciphertext data;
  transmitting encrypted data comprising the first ciphertext data to a second node device, the second node device being configured to obtain second ciphertext data based on the encrypted data and second plaintext data and calculate difference ciphertext data based on the first ciphertext data and the second ciphertext data;
  receiving the difference ciphertext data transmitted by the second node device;
  decrypting the difference ciphertext data to obtain a positive or negative property of a difference between the first plaintext data and the second plaintext data; and
  determining, when the difference between the first plaintext data and the second plaintext data is a positive number, that a numerical comparison result is that the first plaintext data is greater than the second plaintext data; or
  determining, when the difference between the first plaintext data and the second plaintext data is a negative number, that the numerical comparison result is that the first plaintext data is less than the second plaintext data; or determining, when the difference between the first plaintext data and the second plaintext data is 0, the numerical comparison result is that the first plaintext data is equal to the second plaintext data.

10. The method according to claim 9, further comprises: transmitting the numerical comparison result to the second node device.

11. A secure multi-party computation method, performed by a second node device in a joint computing system, the method comprising:

performing computation accuracy negotiation with a first node device such that the first node device determines a modulus in a homomorphic encryption algorithm;

receiving encrypted data transmitted by the first node device, the encrypted data comprising first ciphertext data, and the first node device being configured to perform homomorphic encryption processing on first plaintext data to generate the first ciphertext data;

generating second ciphertext data based on the encrypted data and second plaintext data;

calculating difference ciphertext data based on the first ciphertext data and the second ciphertext data; and transmitting the difference ciphertext data to the first node device, the first node device being configured to decrypt the difference ciphertext data to obtain a positive or negative property of a difference between the first plaintext data and the second plaintext data.

12. The method according to claim 11, wherein the calculating difference ciphertext data based on the first ciphertext data and the second ciphertext data comprises:

performing negative number encoding based on at least one random number, the first ciphertext data, and the second ciphertext data, to obtain difference ciphertext data, the difference ciphertext data being a difference between a product ciphertext corresponding to the first plaintext data and the second ciphertext data, the product ciphertext being ciphertext data corresponding to a product of the first plaintext data and the random number, the second ciphertext data being ciphertext data corresponding to a product of the second plaintext data and the random number, and the random number being generated by the second node device or being jointly generated by the first node device and the second node device, the random number being a positive integer; and the decryption result is a product of a plaintext data difference and the random number, the plaintext data difference being a difference between the first plaintext data and the second plaintext data.

13. The method according to claim 11, wherein the encrypted data further comprises a public key and the modulus and wherein the method further comprises:

generating a first random number;

performing a modulo operation on a product of the first random number and the second plaintext data based on the modulus;

performing homomorphic encryption processing on a modulo operation result based on the public key to generate the second ciphertext data; and calculating a first product ciphertext and generating the difference ciphertext data based on the first ciphertext data and the first random number, the difference ciphertext data being a difference between the first product ciphertext and the second ciphertext data, and the first product ciphertext being a ciphertext corresponding to a product of the first random number and the first plaintext data, the first random number being a positive integer.

14. The method according to claim 11, wherein: the homomorphic encryption algorithm is an affine cipher encryption algorithm, the encrypted data further comprises an encrypted random number, and after the performing computation accuracy information negotiation with the first node device, the method further comprises:

generating a fourth random number and a fifth random number, the fourth random number and the fifth random number being positive integers;

transmitting the fourth random number to the first node device;

generating the second ciphertext data based on the encrypted random number, the fifth random number, and the second plaintext data;

generating a third product ciphertext based on the fourth random number, the fifth random number, and the first ciphertext data; and generating the difference ciphertext data based on a difference between the third product ciphertext and the second ciphertext data, the second ciphertext data being ciphertext data corresponding to a product of the fourth random number, the fifth random number, and the second plaintext data, and the third product ciphertext being ciphertext data corresponding to a product of the fourth random number, the fifth random number, and the first plaintext data.

15. The method according to claim 14, wherein the method further comprises:

generating a third random number;

performing a modulo operation on a product of the third random number and the second plaintext data based on the modulus;

generating the second ciphertext data based on a modulo operation result and a first encrypted random number;

generating a second product ciphertext based on the first ciphertext data and the third random number; and obtaining the difference ciphertext data based on a difference between the second product ciphertext and the second ciphertext data, the second ciphertext data being ciphertext data corresponding to a product of a second random number, the third random number, and the second plaintext data, and the second product ciphertext being ciphertext data corresponding to a product of the second random number, the third random number, and the first plaintext data, the third random number being a positive integer.

16. The method according to claim 11, wherein the method further comprises performing computation accuracy negotiation with the first node device to determine a rounding number;

performing a rounding operation on the second plaintext data based on the rounding number; and performing negative number encoding on a rounding operation result that is less than 0.

17. The method according to claim 11, further comprising:

generating a random number, wherein the random number is a positive integer;

performing negative number encoding based on at least one random number, the first ciphertext data, and the second ciphertext data, to obtain difference ciphertext data, the difference ciphertext data being a difference between a product ciphertext corresponding to the first plaintext data and the second ciphertext data, the product ciphertext being ciphertext data corresponding to a product of the first plaintext data and the random number, the second ciphertext data being ciphertext data corresponding to a product of the second plaintext data and the random number, and wherein the decryption result is a product of a plaintext data difference and the random number, the plaintext data difference being a difference between the first plaintext data and the second plaintext data.

18. A non-transitory computer-readable storage medium for storing a plurality of computer programs, wherein the plurality of computer programs is loaded and executed by at least one processor to implement the secure multi-party computation steps according to claim 11.

19. A secure multi-party computation apparatus, comprising:
- a memory storing a plurality of instructions; and
- at least one processor configured to execute the plurality of instructions to perform the secure multi-party computation steps according to claim 1.

20. A secure multi-party computation apparatus, comprising:
- a memory storing a plurality of instructions; and
- at least one processor configured to execute the plurality of instructions to perform the secure multi-party computation steps according to claim 11.

* * * * *